US008467656B2

(12) United States Patent
Kamio et al.

(10) Patent No.: US 8,467,656 B2
(45) Date of Patent: Jun. 18, 2013

(54) INFORMATION STORAGE MEDIUM, INFORMATION RECORDING METHOD, INFORMATION PLAYBACK METHOD, INFORMATION RECORDING APPARATUS, AND INFORMATION PLAYBACK APPARATUS

(75) Inventors: Hiroyuki Kamio, Tachikawa (JP); Mitsunori Omokawa, Akishima (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1803 days.

(21) Appl. No.: 11/243,566

(22) Filed: Oct. 5, 2005

(65) Prior Publication Data

US 2006/0215997 A1 Sep. 28, 2006

(30) Foreign Application Priority Data

Mar. 9, 2005 (JP) ................................. 2005-065704

(51) Int. Cl.
*H04N 5/765* (2006.01)
*H04N 5/931* (2006.01)

(52) U.S. Cl.
USPC .......................................................... 386/200

(58) Field of Classification Search
USPC .......................................................... 386/46
See application file for complete search history.

(56) References Cited

U.S. PATENT DOCUMENTS 5,978,543 A * 11/1999 Nishimura et al. ............ 386/109
7,023,926 B2 * 4/2006 Matsuura et al. ........ 375/240.27
7,024,102 B1 4/2006 Inoshita et al.
2002/0024908 A1 * 2/2002 Kato ........................... 369/53.34
2002/0184379 A1 * 12/2002 Chen ............................... 709/230
2004/0073949 A1 * 4/2004 Chen et al. ..................... 725/135

FOREIGN PATENT DOCUMENTS

| JP | 2000-152179 | | 5/2000 |
| JP | 2000-156835 | A | 6/2000 |
| JP | 2001-177833 | | 6/2001 |
| JP | 2002-359603 | A | 12/2002 |
| JP | 2003-101962 | | 4/2003 |
| JP | 2003-284066 | A | 10/2003 |
| JP | 2004-295947 | | 10/2004 |

OTHER PUBLICATIONS

An English Translation of Notice of Reasons for Rejection mailed by the Japan Patent Office for Japanese Patent Application No. 2005-065704 on Aug. 11, 2009.
Office Action mailed on Dec. 20, 2011 in corresponding Japanese Application No. JP 2010-276134.

* cited by examiner

*Primary Examiner* — William C Vaughn, Jr.
*Assistant Examiner* — Oluwaseun A Adegeye
(74) *Attorney, Agent, or Firm* — Knobbe, Martens, Olson & Bear LLP

(57) ABSTRACT

In an embodiment, a PATS counter synchronized with an SCR superposed on an MPEG-TS is used. When recording the MPEG-TS, a pair of the value of time stamp information (PTS/DTS) of a previously detected picture and the value of the PATS counter are stored (ST500-ST510). When detecting the next time stamp information, an increase in the time stamp information is compared with an increase in the PATS counter (ST512-ST526). If the significant difference is exhibited (YES in ST600), it is determined that an error is found in the time stamp information value, and a recording process is performed (ST530).

19 Claims, 27 Drawing Sheets

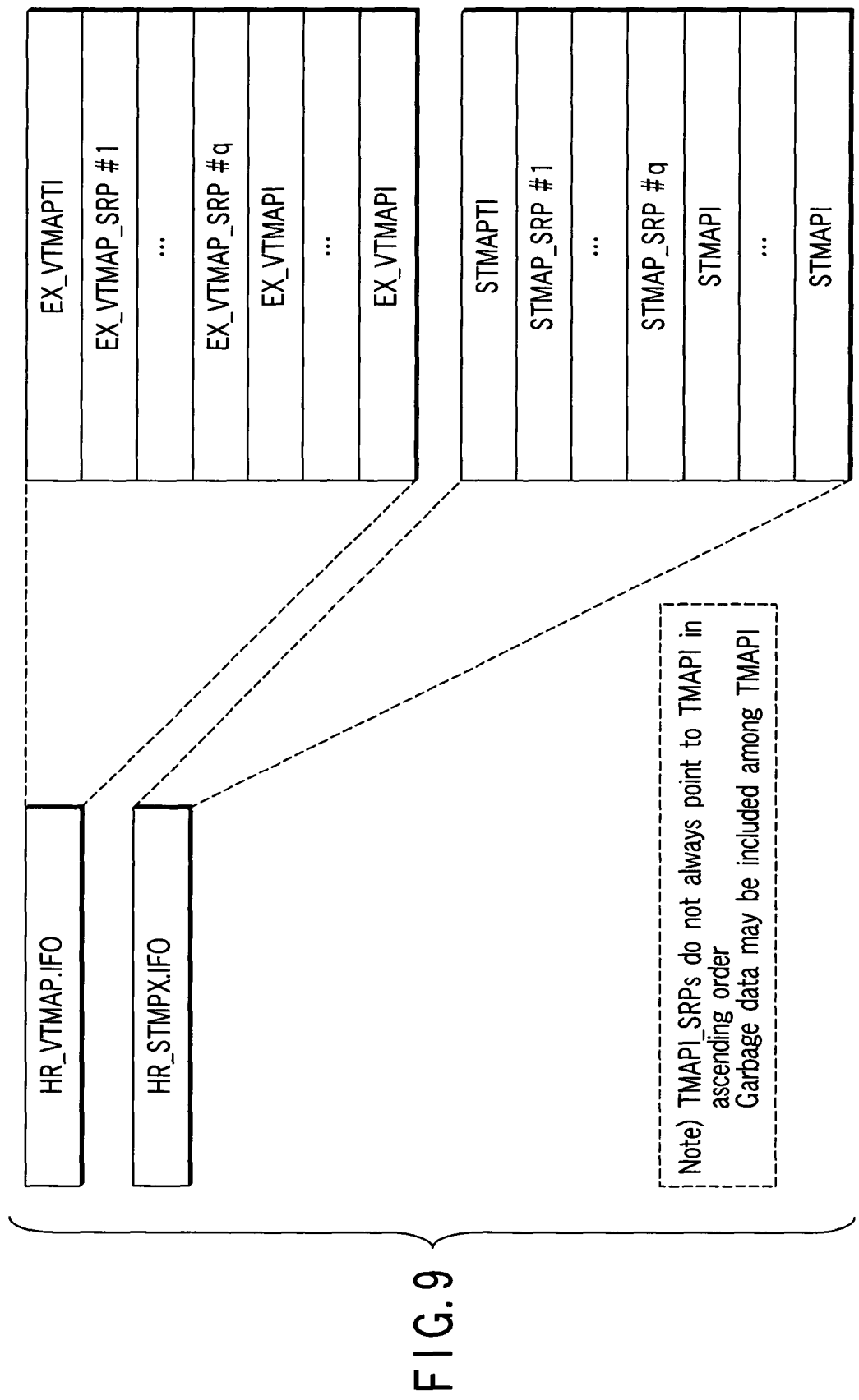
F I G. 9

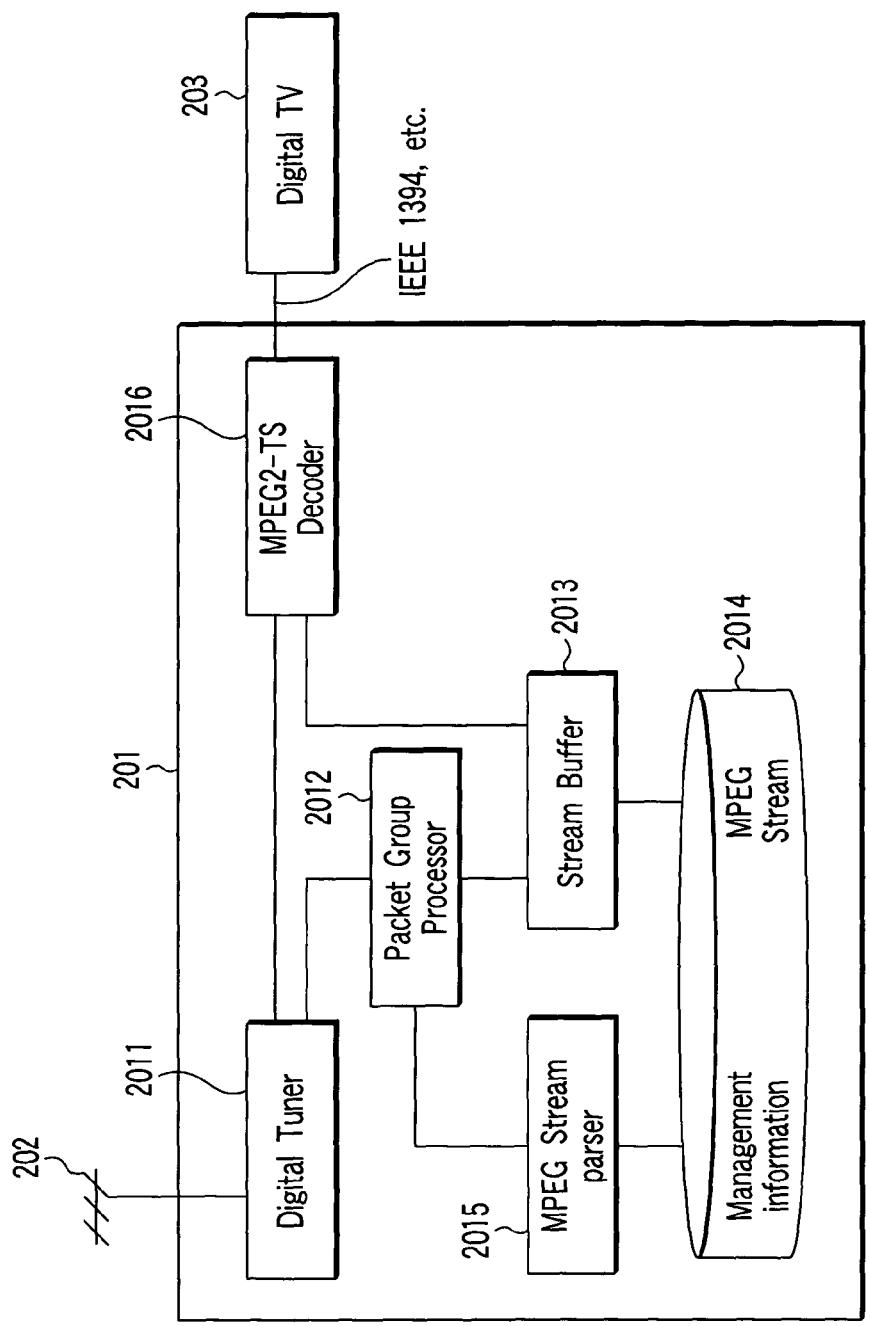
F I G. 20

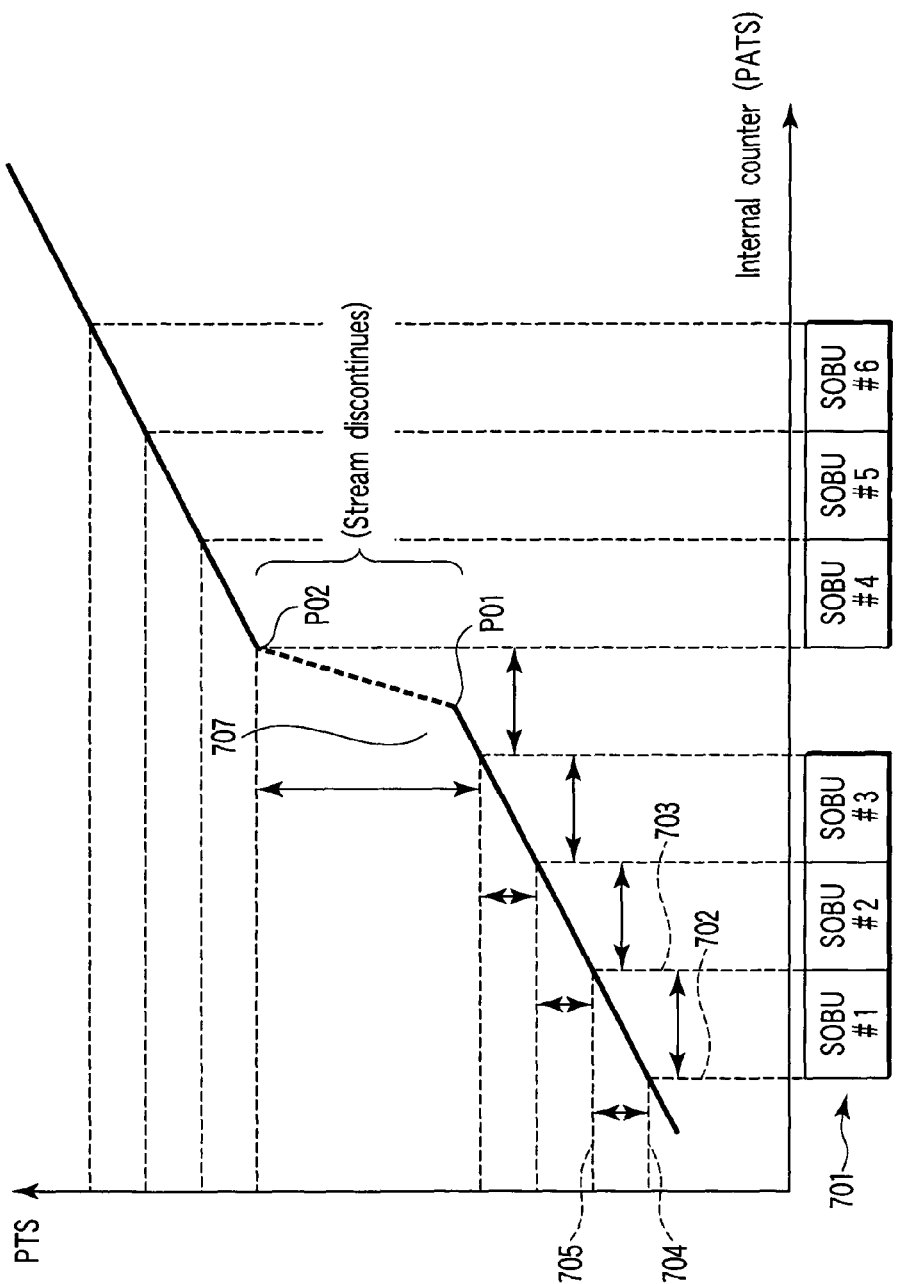
F I G. 24

INFORMATION STORAGE MEDIUM, INFORMATION RECORDING METHOD, INFORMATION PLAYBACK METHOD, INFORMATION RECORDING APPARATUS, AND INFORMATION PLAYBACK APPARATUS

CROSS-REFERENCE TO RELATED APPLICATIONS

This application is based upon and claims the benefit of priority from prior Japanese Patent Application No. 2005-065704, filed Mar. 9, 2005, the entire contents of which are incorporated herein by reference.

BACKGROUND OF THE INVENTION

1. Field of the Invention

The present invention relates to an information storage medium, an information recording/playback method, and an information recording/playback apparatus, which are suited to record/play back a digital stream signal used in digital TV broadcast or the like.

2. Description of the Related Art

In recent years, TV broadcasting has entered the era of digital broadcasts having Hi-Vision programs (programs of high-definition AV information) as principal broadcast contents. The current BS digital TV broadcasting (and forthcoming terrestrial digital TV broadcast) adopts an MPEG2 transport stream (to be abbreviated as MPEG-TS hereinafter). In the field of digital broadcasting using moving pictures, MPEG-TS is expected to be used as a standard format in the future. At the start of such digital TV broadcasting, market needs for a streamer that can directly record digital TV broadcast contents are increasing. As an example of a streamer, the one disclosed in patent reference 1 is known (Jpn. Pat. Appln. KOKAI Publication No. 2004-295947).

Jpn. Pat. Appln. KOKAI Publication No. 2004-295947 proposes that a digital stream signal complying with the MPEG-TS is handled as a stream object. A stream object basically represents a continuous MPEG-TS. However, this patent reference does not consider any measure against a case wherein an error is found in a part of the data, especially, time stamp information such as a PTS (Presentation Time Stamp) or DTS (Decoding Time Stamp) due to, e.g., signal attenuation caused by rain or the like.

BRIEF SUMMARY OF THE INVENTION

According to an embodiment of the invention, an internal counter (PATS counter) which is synchronized with a system clock reference (SCR) superposed on the digital stream signal (MPEG-TS or the like) is used. When the digital stream signal is to be recorded, a pair of a value of time stamp information (PTS/DTS) of a previously detected picture and a value of the internal counter are stored (ST500-ST510), and an increase in the time stamp information is compared with an increase in the internal counter upon detection of next time stamp information (ST512-ST526). Occurrence of an error in the value of the time stamp information is determined when a significant difference is exhibited (YES in ST600), and a recording process is performed (ST530). Upon determination of the significant difference, there is a chance that a stream object is not divided in the recording process (NO in ST600), and the management information size of the stream object is saved accordingly (by the size assured when the SOB is not divided).

Even when a digital stream signal deteriorates on a transmission path or the like, the stream object can be prevented from being unnecessarily divided, and the management information size of the stream object can be saved.

In an embodiment, in a digital broadcast recording apparatus comprising an internal counter which is synchronized with an SCR counter superposed on the digital broadcast wave (MPEG TS or the like), when the digital broadcast is recorded, a pair of a value of PTS or DTS of a previously detected Picture during recording and a value of the internal counter (PATS counter) are stored (ST500 to ST510 shown in FIG. 25). An increase in the PTS or DTS is compared with an increase in the internal counter (PATS counter) upon detection of next PTS or DTS (ST512 to ST526 shown in FIG. 25). Occurrence of an error in the value of the PTS/DTS is determined when a significant difference is exhibited (YES in ST600), and a recording process is performed (ST530 shown in FIG. 25).

In an embodiment, in a digital broadcast recording apparatus which includes an internal counter (PTAS counter) which is synchronized with an SCR counter superposed on the broadcast wave (MPEG TS), detects a GOP in the Stream for recording the digital broadcast, and storing a PTS of a first Picture of the GOP in management information, a pair of a value of the internal counter (PATS counter) and a value of the PTS or DTS of the Picture of the GOP upon detection of the GOP are formed (ST500 to ST510 shown in FIG. 25). A difference between the values of the PTSs or DTSs of the GOPs and a difference between the values of the internal counters (PATS counters) are compared upon detection of a next GOP (ST512 to ST526 shown in FIG. 25). Occurrence of an error in the value of the PTS is determined when a significant difference is exhibited (YES in ST600 shown in FIG. 25), and a recording process is performed (ST530 shown in FIG. 25).

In an embodiment, the pair of the value of the internal counter (PATS counter) and the value of the PTS or DTS of the Picture of the GOP upon detection of the GOP are formed, and then a ratio between the difference between the values of the internal counters and the difference between the values of the PTSs or DTSs of the GOPs is calculated (ST522 to ST526 shown in FIG. 25). The occurrence of the error in the value of the PTS or DTS is determined when the significant difference is exhibited in the calculated ratio (YES in ST600 shown in FIG. 25), and the recording process is performed (ST530 shown in FIG. 25).

In an embodiment, the pair of the value of the internal counter (PATS counter) and the value of the PTS or DTS of the Picture of the GOP upon detection of the GOP are formed, and a ratio between the difference between the values of the internal counters and the difference between the values of the PTSs or DTSs of the GOPs, and a ratio between the difference between the values of the internal counters and the difference between the values of the PTSs or DTSs of the GOPs upon detection of a preceding GOP are calculated (ST512 to ST526 shown in FIG. 25). Even when the significant difference is exhibited in the ratio between the GOP and the preceding GOP (YES in ST600 shown in FIG. 25), if the significant difference is not exhibited in the ratio between the GOP and a second preceding GOP, occurrence of an error in a PTS of the preceding GOP is determined (YES in ST608 shown in FIG. 27), and the recording process is performed (ST610 shown in FIG. 27).

In an embodiment, the pair of the value of the internal counter (PATS counter) and the value of the PTS or DTS of the Picture of the GOP upon detection of the GOP are formed, and a ratio between the difference between the values of the internal counters and the difference between the values of the PTSs or DTSs of the GOPs, and a ratio between the difference between the values of the internal counters and the difference between the values of the PTSs or DTSs of the GOPs upon detection of a preceding GOP are calculated (ST512 to ST526 shown in FIG. 25). When the significant difference is exhibited in the ratio between the GOP and the preceding GOP (YES in ST600 shown in FIG. 25), and the significant difference is also exhibited in the ratio between the GOP and a second preceding GOP, a discontinuous point of a stream at the position is determined (NO in ST608 shown in FIG. 27), and the recording process is performed (ST530 shown in FIG. 27).

As described above, even when an MPEG TS data error is found during recording, the number of the stream objects can be saved, and a recording process can be continued. As a result, a control operation with respect to the digital broadcast can be implemented with high precision.

For purposes of summarizing the invention, certain aspects, advantages, and novel features of the invention have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

BRIEF DESCRIPTION OF THE SEVERAL VIEWS OF THE DRAWING

A general architecture that implements the various features of the invention will now be described with reference to the drawings. The drawings and the associated descriptions are provided to illustrate embodiments of the invention and not to limit the scope of the invention.

FIG. 9 is a view for explaining an example of the configuration of HR_VTMAP.IFO and HR_STMAPx.IFO included in a DVD_HDVR directory;

FIG. 20 is a schematic block diagram showing principal part of a digital broadcast recording apparatus;

FIG. 24 is a view for explaining an example of the relationship between an increase in time stamp (PTS) and an increase in corresponding internal counter (PATS counter) upon recording a Stream which is discontinued midway;

FIG. 26 is a view for explaining an example of the relationship between an increase in time stamp (PTS) and an increase in corresponding internal counter (PATS counter) upon recording a Stream in which the PTS value is partially broken due to noise on a transmission path or the like.

DETAILED DESCRIPTION OF THE INVENTION

Figure 1:
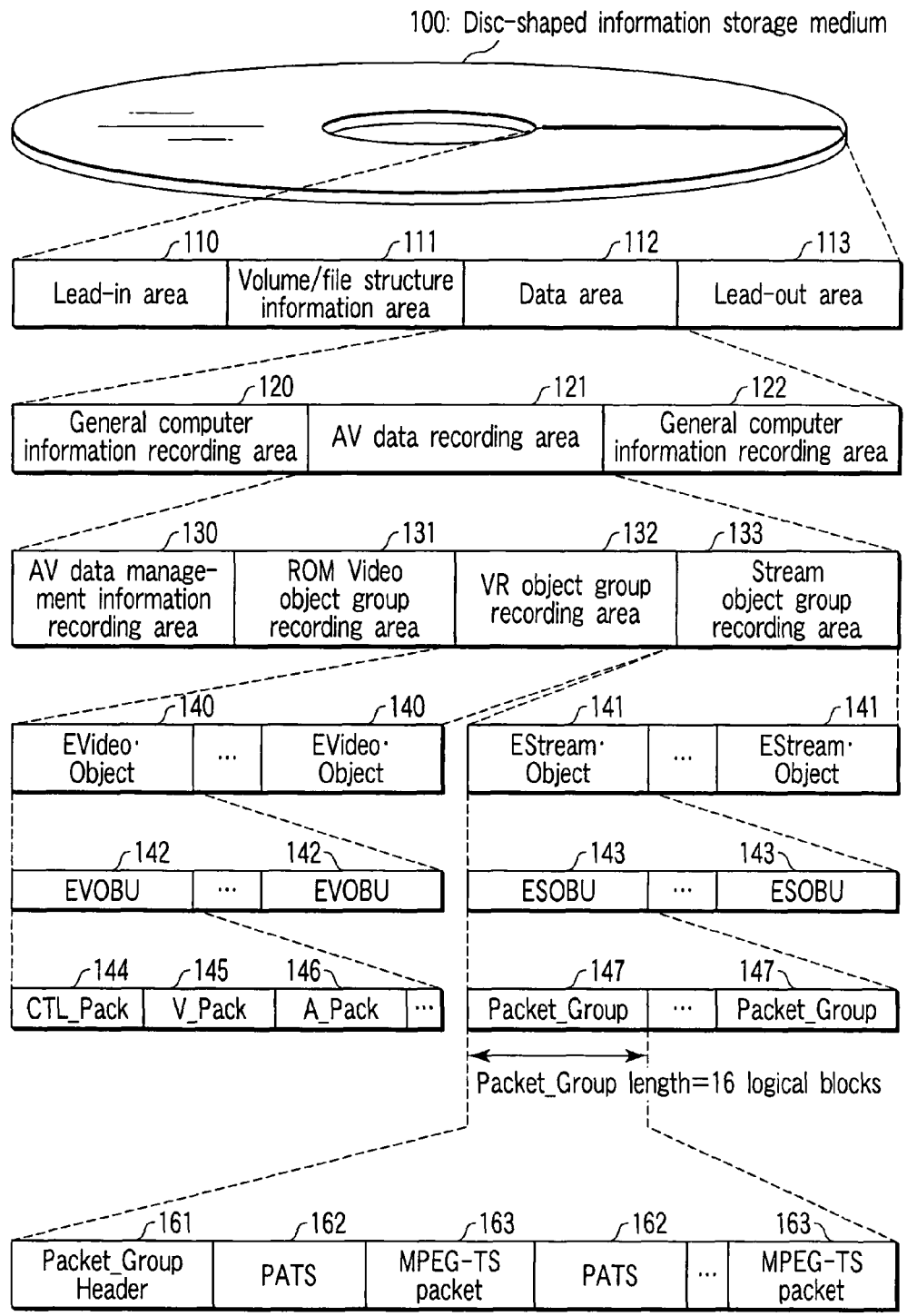
FIG. 1 is a view for explaining the data structure according to an embodiment of the invention.

Various embodiments of the invention will be described hereinafter with reference to the accompanying drawings. Different digital broadcast schemes are adopted in respective countries: for example, DVB (Digital Video Broadcasting) in Europe; ATSC (Advanced Television Systems Committee) in U.S.A.; and ARIB (Association of Radio Industries and Businesses) in Japan.

In DVB, the video format is MPEG2, the resolutions are 1152*1440i, 1080*1920(i, p), 1035*1920, 720*1280, (576, 480)*(720, 544, 480, 352), and (288, 240)*352, the frame frequencies are 30 Hz and 25 Hz, the audio format includes MPEG-1 audio and MPEG-2 Audio, and the sampling frequencies are 32 kHz, 44.1 kHz, and 48 kHz.

In ATSC, the video format is MPEG2, the resolutions are 1080*1920(i, p), 720*1280p, 480*704(i, p), and 480*640(i, p), the frame frequencies are 23.976 Hz, 24 Hz, 29.97 Hz, 30 Hz, 59.94 Hz, and 60 Hz, the audio format includes MPEG1

Audio Layer 1 & 2 (DirecTV) and AC3 Layer 1 & 2 (Primstar), and the sampling frequencies are 48 kHz, 44.1 kHz, and 32 kHz.

In ARIB, the video format is MPEG2, the resolutions are 1080i, 720p, 480i, and 480p, the frame rates are 29.97 Hz and 59.94 Hz, the audio format includes AAC (MPEG-2 Advanced Audio Coding), and the sampling frequencies are 48 kHz, 44.1 kHz, 32 kHz, 24 kHz, 22.05 kHz, and 16 kHz.

An MPEG-TS scheme as a basic format common to broadcast schemes which broadcast (distribute) compressed moving picture data such as a digital TV broadcast, a broadcast that uses a wired network such as the Internet or the like, and so on is divided into a packet management data field and payload.

The payload includes data to be played back in a scrambled state. According to ARIB, a PAT (Program Association Table), PMT (Program Map Table), and SI (Service Information) are not scrambled. Also, various kinds of management information are generated using the PMT and SI (SDT: Service Description Table, EIT: Event Information Table, BAT: Bouquet Association Table).

The contents to be played back include MPEG video data, Dolby AC3(R) audio data, MPEG audio data, data broadcast data, and the like. Also, the contents include information (program information and the like) such as PAT, PMT, SI, and the like upon playback although they are not directly related to the contents to be played back. The PAT includes the PID (Packet Identification) of the PMT for each program, and the PMT records the PIDs of video data and audio data.

A normal playback sequence of an STB is as follows. That is, when the user determines a program based on EPG information, the PAT is loaded at the start time of the target program. The PID of a PMT, which belongs to the desired program, is determined on the basis of that data, and the target PMT is read out in accordance with that PID. Then, the PIDs of video and audio packets to be played back, which are included in the PMT, are determined. Video and audio attributes are read out based on the PMT and SI and are set in respective decoders. The video and audio data are extracted and played back in accordance with their PIDs. Note that the PAT, PMT, SI, and the like are transmitted at intervals of several 100 ms since they are also used during playback.

Note that different digital broadcast schemes are adopted in respective countries: for example, DVB (Digital Video Broadcasting) in Europe; ATSC (Advanced Television Systems Committee) in U.S.A.; and ARIB (Association of Radio Industries and Businesses) in Japan.

Figure 2:
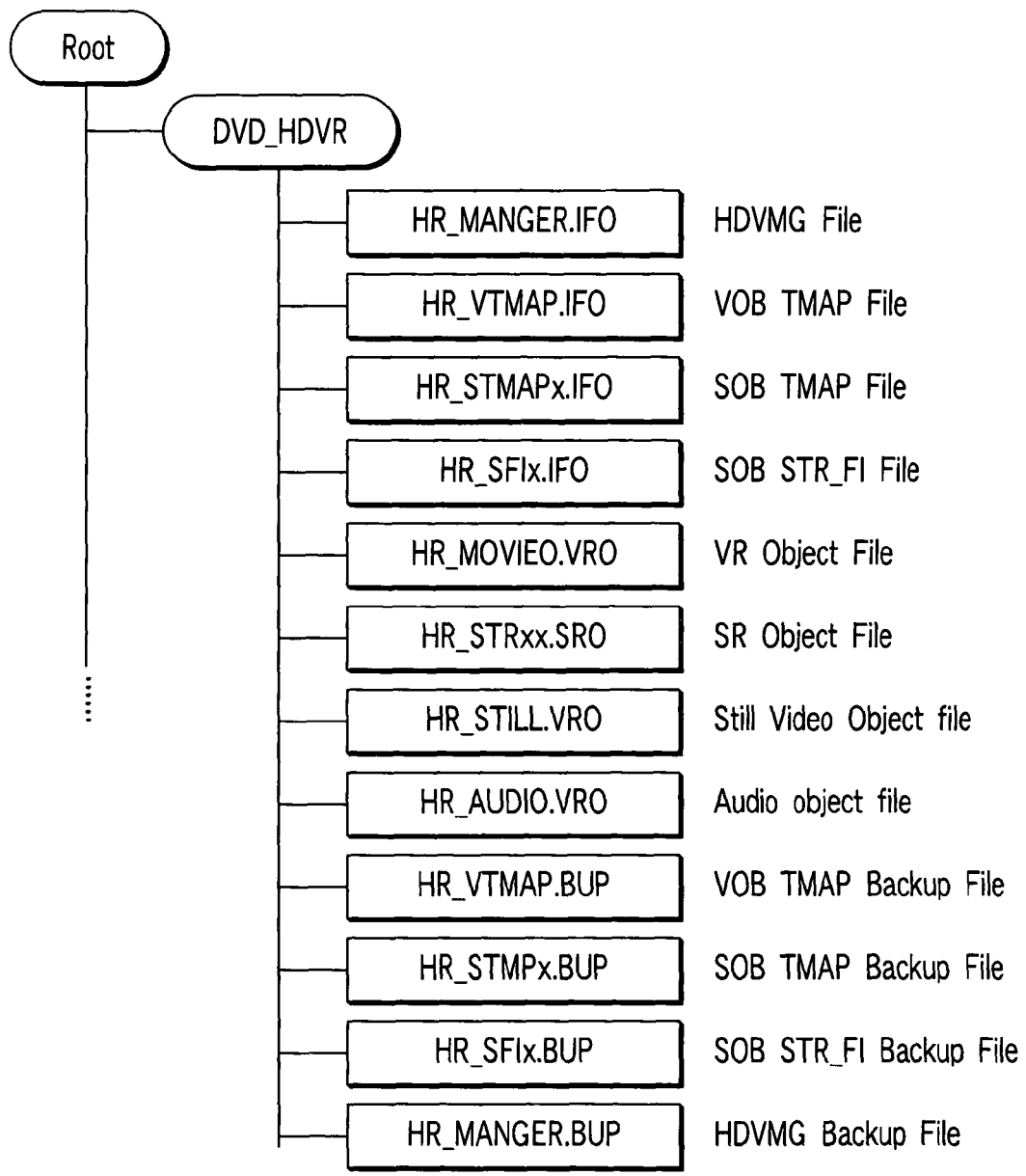
FIG. 2 is a view for explaining the file structure according to an embodiment of the invention.

In this manner, digital broad broadcast schemes are different in different countries, and can be different for respective broadcast stations. For this reason, a recorder records objects as files in accordance with each individual scheme to be used. For this reason, files to be added to the existing VR file configuration are HR_SFIx.IFO and HR_SFIx.bup, as shown in FIG. 2, where "x" indicates the presence of a plurality of files. Hence, such files are added for respective broadcast schemes. When "x"=00, these files are used when the broadcast scheme is unknown or the recorder does not support that broadcast scheme. In this case, a stream is saved as a stream (SOB_STRB) of TYPE B.

Figure 3:
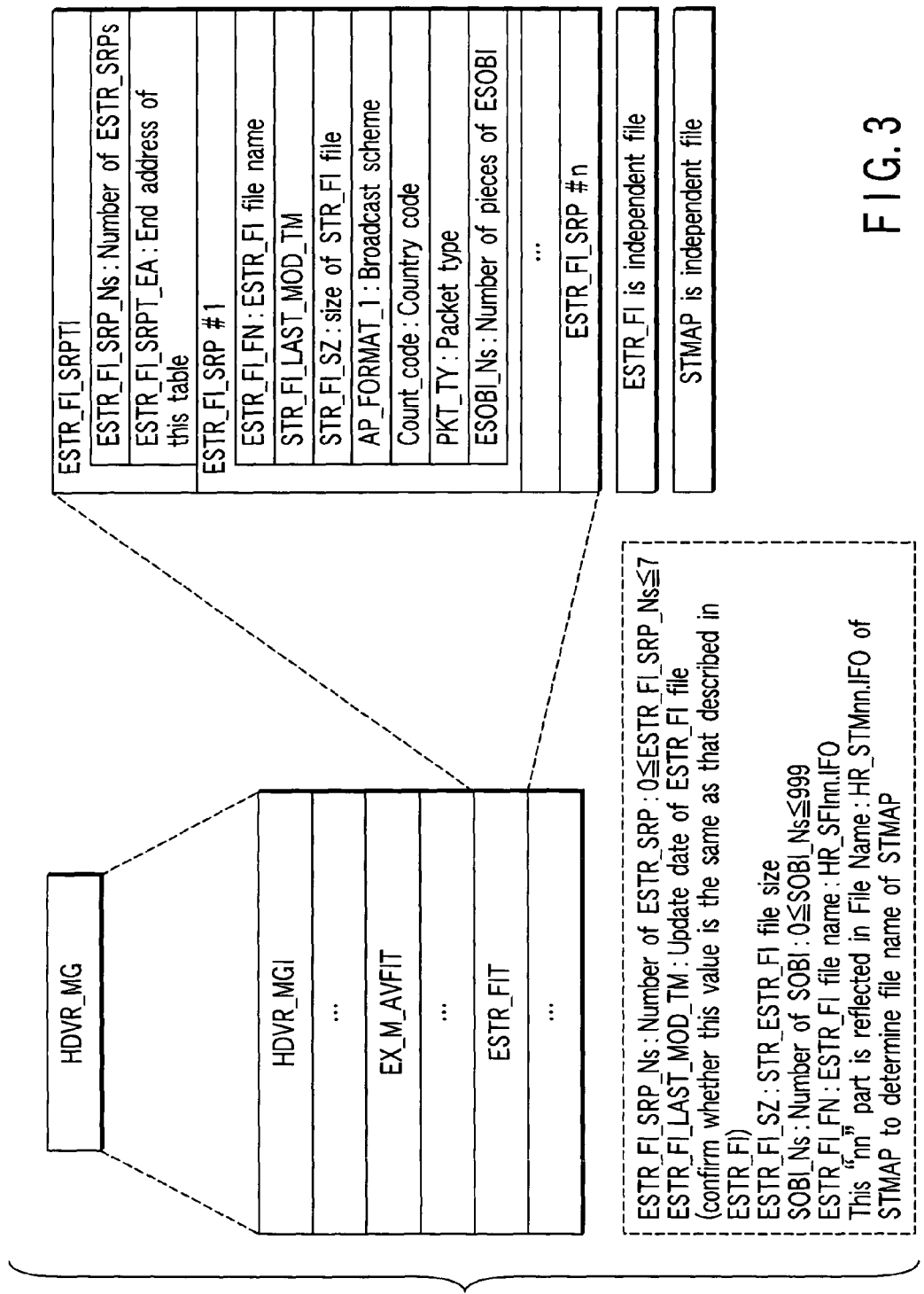
FIG. 3 is a view for explaining an example of the configuration of an ESTR_FIT.

Hence, since ESTR_FI as management information for digital broadcasting is changed for each broadcast station (or each broadcast scheme), a plurality of pieces of ESTR_FI exist. In order to designate an ESTR_FI file to be used, ESTR_FI_SRP information exists, and its structure is a file name of ESTR_FI:ESTR_FI_FN, update date information of the ESTR_FI file: ESTR_FI_LAST_MOD_TM, an ESTR_FI file size: ESTR_FI_SZ, AP_FORMAT_1 as broadcast scheme information, country code, packet type, and the number of pieces of SOBI, as shown in FIG. 3. Note that the update date information is also set in the ESTR_FI file. When ESTR_FI is changed upon editing, that value is updated. Upon playback, the updated value is compared with the value in the ESTR_FI file. If the two values are the same, playback is permitted. The number of pieces of ESTR_FI is seven or less, and the number of pieces of SOBI is 999 or less. A part "nn" of ESTR_FI file name: HR_SFInn.IFO is reflected in File Name: HR_STMnn.IFO of an STMAP, thus determining the file name of the STMAP.

Figure 4:
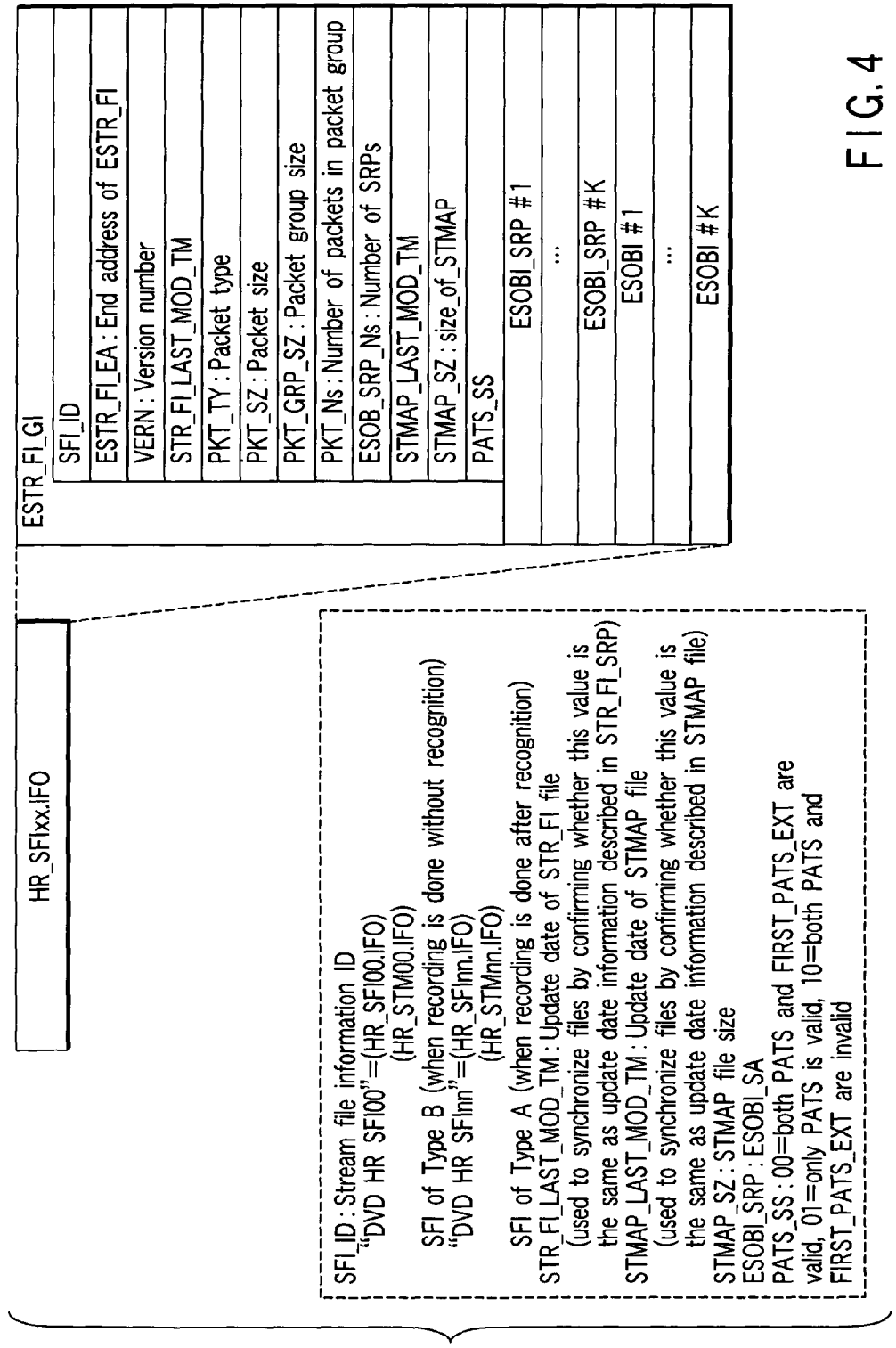
FIG. 4 is a view for explaining a practical example of HR_SFIxx.IFO.

As shown in FIG. 4, the ESTR_FI file (HR_SFIxx.IFO) has the same configuration as that of normal ESTR_FI. Furthermore, in case of a cognizable stream (TYPE A: STRA), a TMAP can be generated on the PTM base. However, in case of a non-cognizable stream (when data cannot be descrambled or when data of a scheme different from the assumed broadcast station is input) (TYPE B: STRB), the TMAP can be generated on a reception time (PATS) base in place of PTM base. However, since the PATS is not a playback time, special playback or the like cannot be accurately made, but it can be roughly made.

In FIG. 4, PATS_SS includes a value indicating the accuracy of the PATS. For example, when an apparatus shown in FIG. 16 to be described later fetches data itself of a network, IEEE1394, or the like, the PATS includes 4 bytes or is a dummy in some cases. In order to cope with such case, PATS_SS values "00=both PATS and FIRST_PATS_EXT are valid: accuracy 6 bytes)", "01=only PATS is valid: accuracy 4 bytes", and "10=both PATS and FIRST_PATS_EXT are invalid: no accuracy" are prepared.

As one of the features of digital broadcasting, for example, multi-view broadcasting is known. In multi-view broadcasting, a plurality of video data are broadcasted at the same time (by time sharing), and the user can play back one of these video data of his or her choice. In this manner, the user can select one of a plurality of contents according to his or her favor or the like. For example, when a recorder receives, as one TS, streams X, Y, and Z as a multi-angle broadcast and stream U as a rain attenuation broadcast, the control is made to allow the user to select and play back a stream upon playback, and to freely switch among streams using a key. To cope with this, grouping information (GPI) is added to achieve this object.

Furthermore, a DVD recorder normally has TMAPI as VOB management information. This information is used to divide VOB/SOB for each VOBU/SOBU and to implement playback, special playback, and the like for that unit, and a maximum of one piece of information is required per 0.5 s. For this reason, if the disc size increases or a compression method with high compression efficiency is adopted in the future, the number of pieces of TMAPI increases, and complicated management occurs when an edit process or the like is made. If TMAPI is stored in IFO, management data in other non-related fields are moved or rewritten when TMAPI is changed, resulting in poor efficiency. In order to improve such situation, TMAPI is recorded in an independent field.

Moreover, a video recorder can have unique functions which are not described in the DVD format depending on the manufacturers and models, and can be differentiated from other manufacturers. In this case, manufacturer unique information is embedded in object data. Hence, in an embodiment of the invention, MNFI (Manufacturer's Information) is assured in a packet group header as its field.

As shown in FIG. 1, data areas in a DVD disc include a volume/file structure information area that stores a file system, and a data area that actually records data files. The file system includes information indicating the recording locations of files. The data area is divided into areas that record general computer data, and an area that records AV data. The AV data recording area includes an AV data management information area that stores a VMG file used to manage AV data, a VR object group recording area that records object data (EVOBS) files (VRO files) complying with the video recording standard, and a recording area that records stream object data (ESOBS: Extended Stream Object Set) files (SRO files) which record objects (ESOBS) compatible to digital broadcasting. Note that different directories are prepared in correspondence with formats (e.g., VIDEO-TS for DVD-Video (ROM Video) and DVD-RTAV for DVD-RTR (recordable/reproducible DVD), and the digital broadcast compatible DVD standard to be described below is recorded in, e.g., a DVD_HDVR directory.

That is, as shown in FIG. 2, a DVD_HDVR directory records a VMG file used to manage data, VRO files as object files for analog recording of analog broadcast data, line-in data, and the like, and an SRO file as a digital broadcast object. The SRO file records an SOBS (Stream Object Set). Management data is recorded in the VMG file common to VR, and undergoes control common to VR. The management data is linked for each cell, and the playback location is designated for each playback time. This management data is called VR_MANEGER.IFO. When a TMAPT is recorded as an independent file, HR_VTMAP.IFO and HR_STMAP.IFO, and HR_VTMAP.BUP and HR_STMAP.BUP as their backup files are added, as shown in FIG. 2.

The structure of each ESOBU includes one or more ESOBs. Each ESOB corresponds to, e.g., one program. The ESOB includes one or more ESOBUs (Extended Stream object units), each of which corresponds to object data for a given time interval (which changes depending on the value of ESOBU_PB_TM_RNG) or one or more GOP data. However, when the transfer rate is low, one GOP data cannot often be sent within 1 s (1 second) (VR can freely set the data unit configuration since it adopts internal encoding, but digital broadcasting cannot specify the next incoming data since encoding is done by a broadcast station). On the other hand, the transfer rate can be high, and I-picture data can be sent frequently. In such case, the ESOBU is delimited frequently, and ESOBU management information increases accordingly, thus ballooning the whole management information. For this reason, it is appropriate to delimit ESOBUs by a given time interval (it is possible to delimit ESOBUs by picture data except for the last ESOBU of the ESOB: the delimitation unit corresponds to a picture unit (e.g., for each sec)) determined by a total video recording time or by one or more GOP data. When management information is formed on the PATS base in case of a non-cognizable stream, the ESOBUs are delimited at time intervals indicated by SOBU_PATS_TM_RNG. There are two types of SOBU_PATS_TM_RNG: it is designated in seconds or by a 27-MHz count value.

In this embodiment, one ESOBU includes one or more packet groups, each of which corresponds to 16 logical blocks (1 LB=2048 bytes; 16 LBs=32640 bytes). Each packet group includes a packet group header and (170) TS packets. The arrival time of each TS packet can be expressed by a PAT (Packet Arrival Time: 4 bytes) which is allocated before each TS packet.

The arrival times of TS packets are linearly counted up until a video recording end time to have a video recording start time as 0 (or a predetermined value). For this reason, when a plurality of programs are recorded during video recording or in case of an edited program or the like, a system time counter suffers discontinuity (STC discontinuity). In this case, STC is adjusted. Even in such case, the transfer time is linearly increased. A method of executing processes using an internal counter (90a in an embodiment shown in FIG. 16) which is free from STC transfer (changeover), and a method of dividing an ESOB upon changeover are available. However, in case of linear counting, the count time interval of the internal counter is synchronized with that of the STC which corresponds to the interval between neighboring PCR (Program Clock Reference) fetch timings in a playback synchronized state.

Upon dividing an ESOB, the discontinue timing is accurately detected. However, a packet group can include up to two ESOBs. That is, packet groups are not aligned for respective ESOBs.

Figure 14:
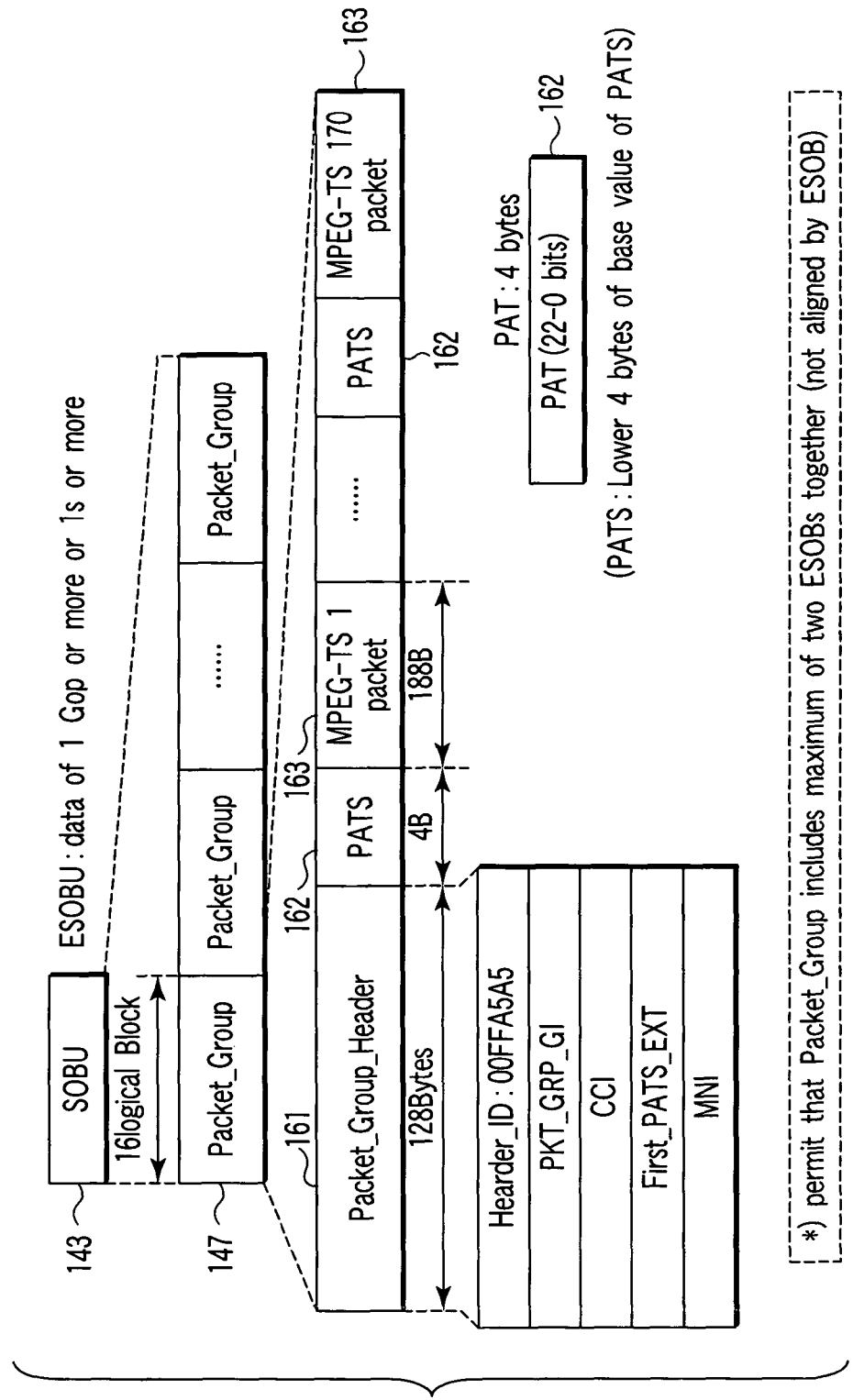
FIG. 14 is a view for explaining an example of the configuration of a data unit for a stream object.
Figure 15:
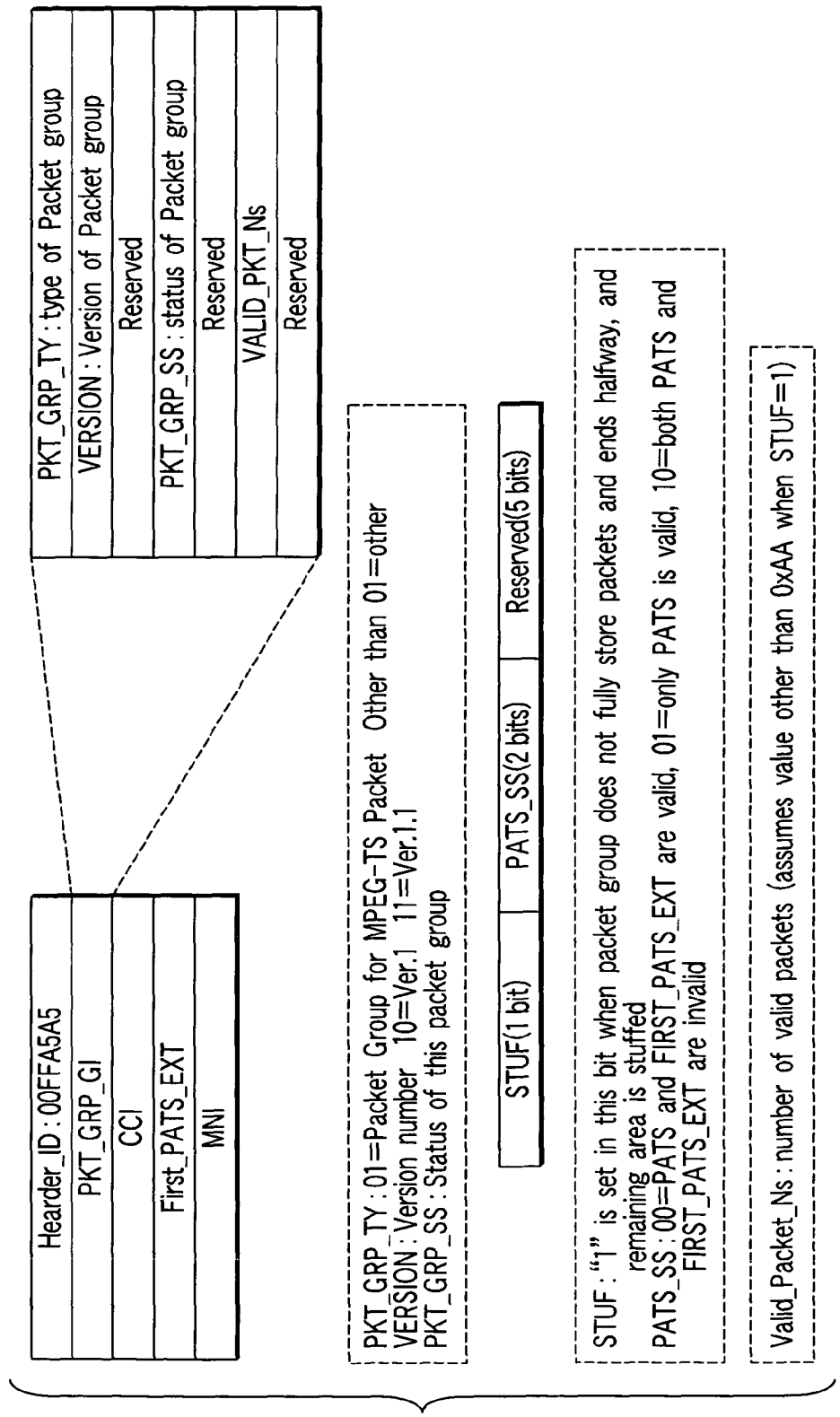
FIG. 15 is a view for explaining a practical example of PKT_GRP_GI.

As shown in FIGS. 14 and 15, a packet group header sets a sync pattern at the head of a packet group, and includes PKT_GRP_GI, CCI: copy management information (Copy Control Information), FIRST_PATS_EXT, and MNI (manufacturer's information).

The PKT_GRP_GI includes PKT_GRP_TY: a packet group type (1: MPEG-TS), VERSION: a DVD BOOK version number, PKT_GRP_SS: status information of the packet group, Valid_PKT_Ns: the number of valid packets in the packet group, and FIRST_PATS_EXT: the upper 2 bytes of the PATS for the first packet.

Furthermore, PKT_GRP_SS (FIG. 15) includes STUF: a bit indicating if stuffing is done (if this bit is set, it indicates that Valid_PKT_Ns assumes a value other than 0xAA), and PATS_SS (see FIG. 4): a value indicating the accuracy of the PATS (00=both PATS and FIRST_PATS_EXT are valid: accuracy 6 bytes, 01=only PATS is valid: accuracy 4 bytes, and 10=both PATS and FIRST_PATS_EXT are invalid: no accuracy).

CCI can store digital copy control (00=copy never, 01=copy once, 11=copy free), analog copy control (00=no APS, 01=APS type 1, 10=APS type 2, 11=APS type 3), EPN (0=contents protection, 1=no contents protection), and ICT (0=analog video output resolution constraint, 1=no constraint). Note that APS is an abbreviation for "Analog Protection System", and an embodiment of the invention assumes Macrovision.

The MNFI includes MNF_ID and MNF_DATA. The MNF_ID is a value representing each manufacturer. The MNF_DATA after the MNF_ID is a data field which can be freely set for each corporation. FIRST_PATS_EXT corresponds to the upper 2 bytes of the arrival time of the packet at the head of the packet group, and the remaining 4 bytes are assigned before each packet. In this manner, the playback process with an accurate time is enabled.

The management information will be described below. As shown in FIG. 2, the HDVR directory stores HR_MANGER.IFO as a DVD management information file, VRO files as analog video object files, and an SRO file that supports digital broadcast. Management information of stream data is saved in the VMG file, as shown in FIG. 2, and stream data are managed on the same level as VR data.

Stream management information is saved in an ESTR_FIT (Extended Stream File Information table). The ESTR_FIT includes ESTR_FITI (ESTR_FIT information), one or more ESTR_FI_SRPs, and one or more pieces of ESTR_FI (Extended Stream File Information) indicated by these SRPs. The ESTR_FITI includes the total number of pieces of ESTR_FI, and the end address of this table. Each ESTR_FI includes ESTR_FI_GI (ESTR_FI General Information), one or more ESOBI_SRPs (Extended Stream Object Information Search Pointers), and one or more pieces of ESOBI (ESOB Information) which are as many as the SRPs and are indicated by their values.

The ESTR_FI_GI includes the file name/file number of an object managed by the ESTR_FI of interest, the number of ESOBI_SRPs in the ESTR_FI of interest, the type (AP_FORMAT_1) of digital broadcast as a source of the recorded contents, the recording country code: Country code (JPN=Japan), PKT_TY (1=MPEG-TS), PKT_GP_SZ (fixed to 16 logical blocks), and PKT_Ns (0xAA: fixed to 170 TS packets).

Figure 5:
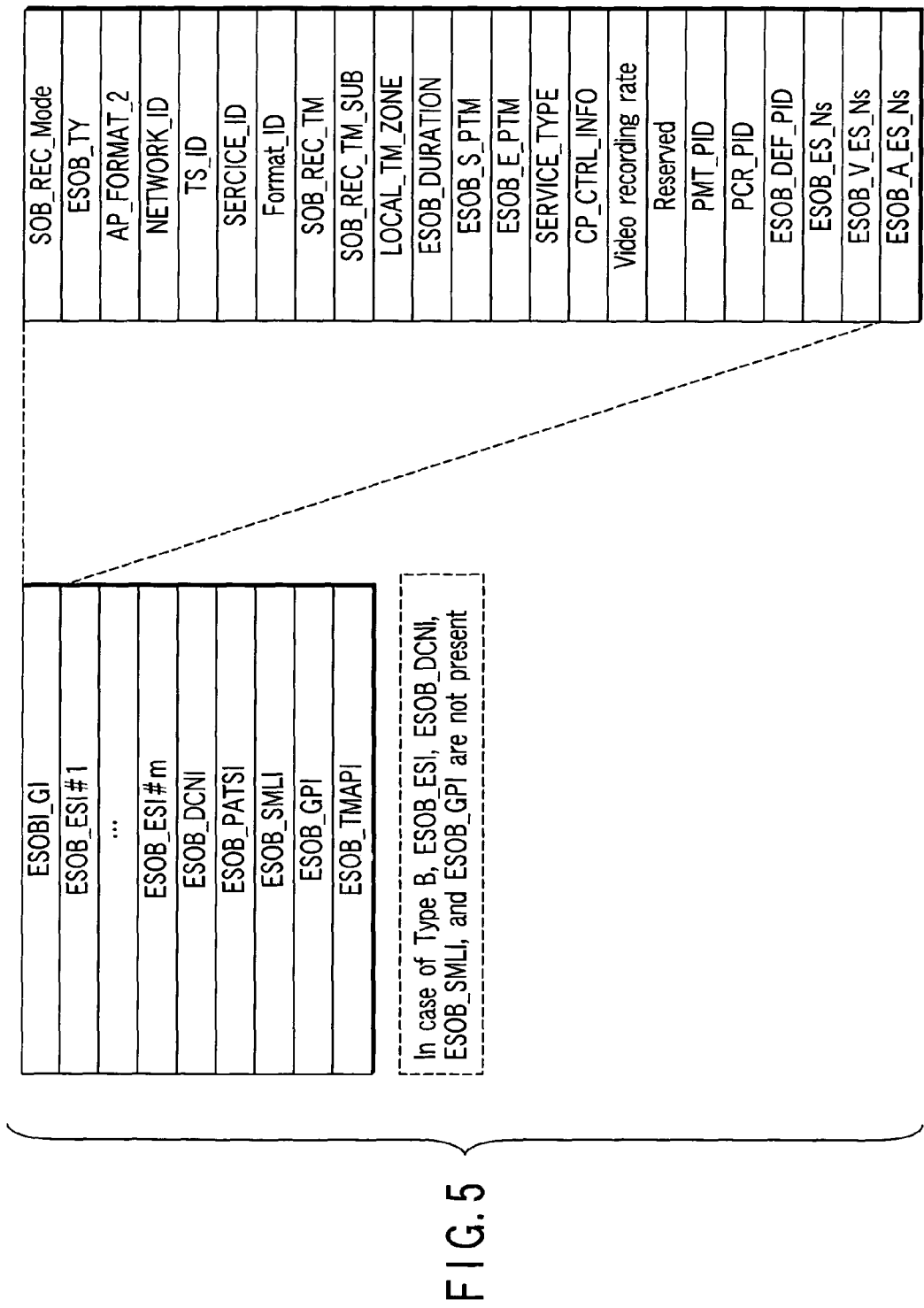
FIG. 5 is a view for explaining an example of the configuration of ESOBI_GI.

FIG. 5 is a view for explaining an example of the configuration of ESOBI_GI included in the ESOBI shown in FIG. 4. The ESOBI_GI includes various kinds of information shown in FIG. 5 in the order listed in FIG. 5.

That is, the ESOBI (FIG. 5) includes ESOBI_GI, ESOBI_ESI# corresponding to ESOB_V_ESI (Extended Video Elementary Information) and/or ESOB_A_ESI (Extended Audio Elementary Information), ESOB_DCNI (Discontinuity Information), ESOB_PATSI (Packet Arrival Time Information), ESOB_SMLI (Extended Seamless Information), ESOB_AGAPI (ESOB Audio GAP Information), ESOB_TMAP (ESOB Time Map), and ESOB_ES_GPI (ESOB_ES Group Information).

The ESOBI_GI includes AP_FORMAT (1=ISDB-S: BS/CS broadcast, 2=ISDB-T: terrestrial digital broadcast), video recording start time, video recording time, start PTM, and end PTM. Furthermore, the ESOBI_GI includes PROGRAM_NUMBER (SERVICE_ID), PMT_PID, NETWORK_ID, TS_ID, and FORMAT_ID on the basis of the values of PSI (Program Specific Information) and SI (Service Information), and ESOB_ES_Ns (the number of ESs selected for video recording), ESOB_V_ES_Ns (the number of ESs for which TMAP data are generated of recorded video ESs), ESOB_A_ES_Ns (the number of ESs for which TMAP data are generated of recorded audio ESs), CP_CTL_IFO, a video recording rate, and the like on the basis of data to be recorded. Bits b15 and b14 of ESOB_TY emulate the types of the TMAP: 0=PTM base, and 1=PATS base.

Figure 6:
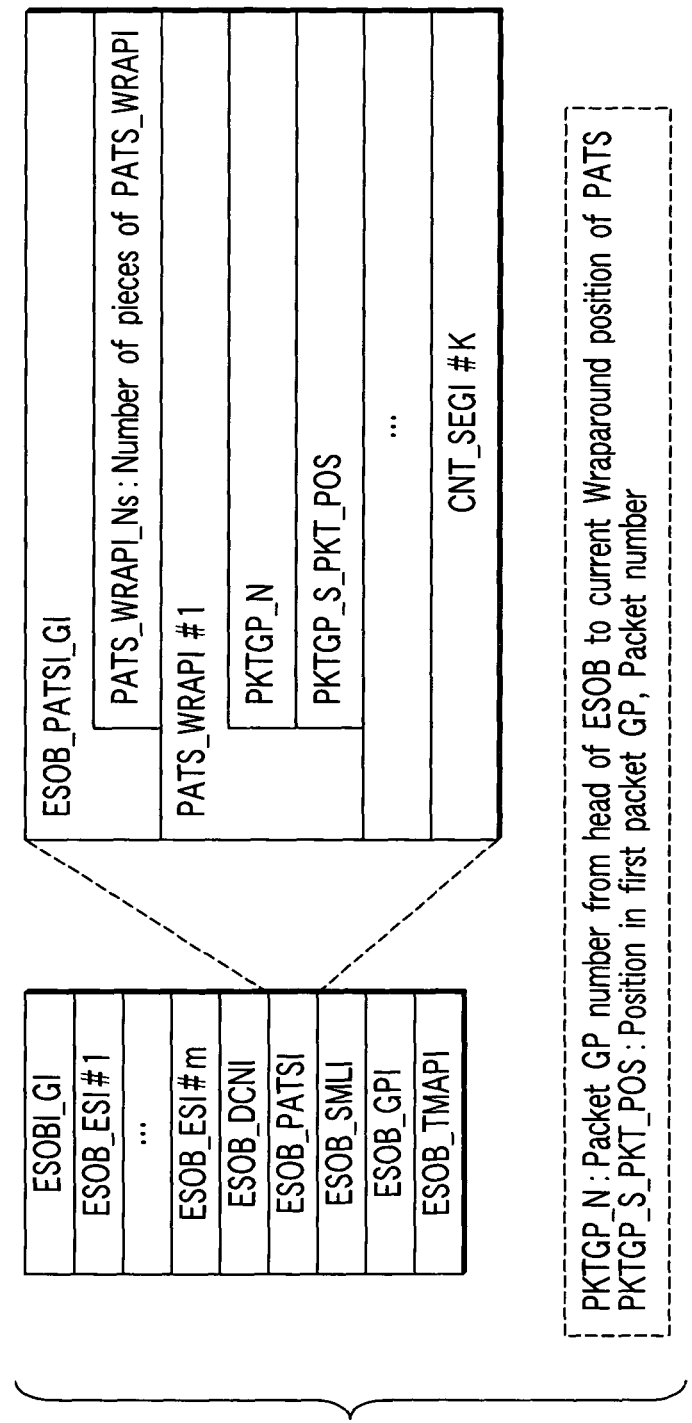
FIG. 6 is a view for explaining a practical example of ESOB_PATSI.

ESOB_PATSI (FIG. 6) includes ESOB_PATSI_GI and PATS_WRAPI#1 to PATS_WRAPI#K. The ESOB_PATSI_GI includes information indicating the number of pieces of PATS_WRAPI. Each PATS_WRAPI indicates the wrap-around position information of the PATS, and includes a packet group number and a packet number in the packet group.

The ESOB_TMAP includes ESOB_TMAP_GI and one or more pieces of ES_TMAPI. The ESOB_TMAP_GI includes TMAP_TY (=0: PTM base, =1: PATS base), ADR_OFS (a packet group number (or LB address) from the head of a file to the head of an ESOB), ESOBU_PB_TM_RNG (ESOBU playback time range: 1=approximately 0.4 s to approximately 1.2 s, 2=approximately 1 s to approximately 2 s, 3=approximately 2 s to approximately 3 s), ESOB_S_PKT_POS (the start position of the head of an ESOB in a packet group: 1≦ESOB_S_PKT_POS≦170), and ESOB_E_PKT_POS (the end position of the head of an ESOB in a packet group: 1≦ESOB_E_PKT_POS≦170) (in case of the PTM base).

ES_TMAPI includes ES_PID (the PID of a target ES of this TMAP: there are two description methods of the PID: a method of describing the PID using 13-bit real data, and a method of describing the order in the PMT), ADR_OFS (logical address from the head of an ESOB file to the head of this ES), ES_S_PTM (start PTM), ES_E_PTM (end PTM), ES_ESOBU_ENT_Ns (the number of ESOBU_ENTs), LAST_ESOBU_E PKT POS (position of the last ESOBU in a packet group), and STMAP_N (the number of a TMAP in the STMAPT, which belongs to this ES: this number can be omitted when the STMAPTs are recorded in independent areas for each STR_FI or when STMAPs are recorded in turn). An STMAPT is recorded in an independent area (independent file). The STMAPT includes STMAPTI, one or more STMAPI_SPPs, and one or more pieces of STMAPI as many as the number of STMAPI_SRPs.

Figure 10:
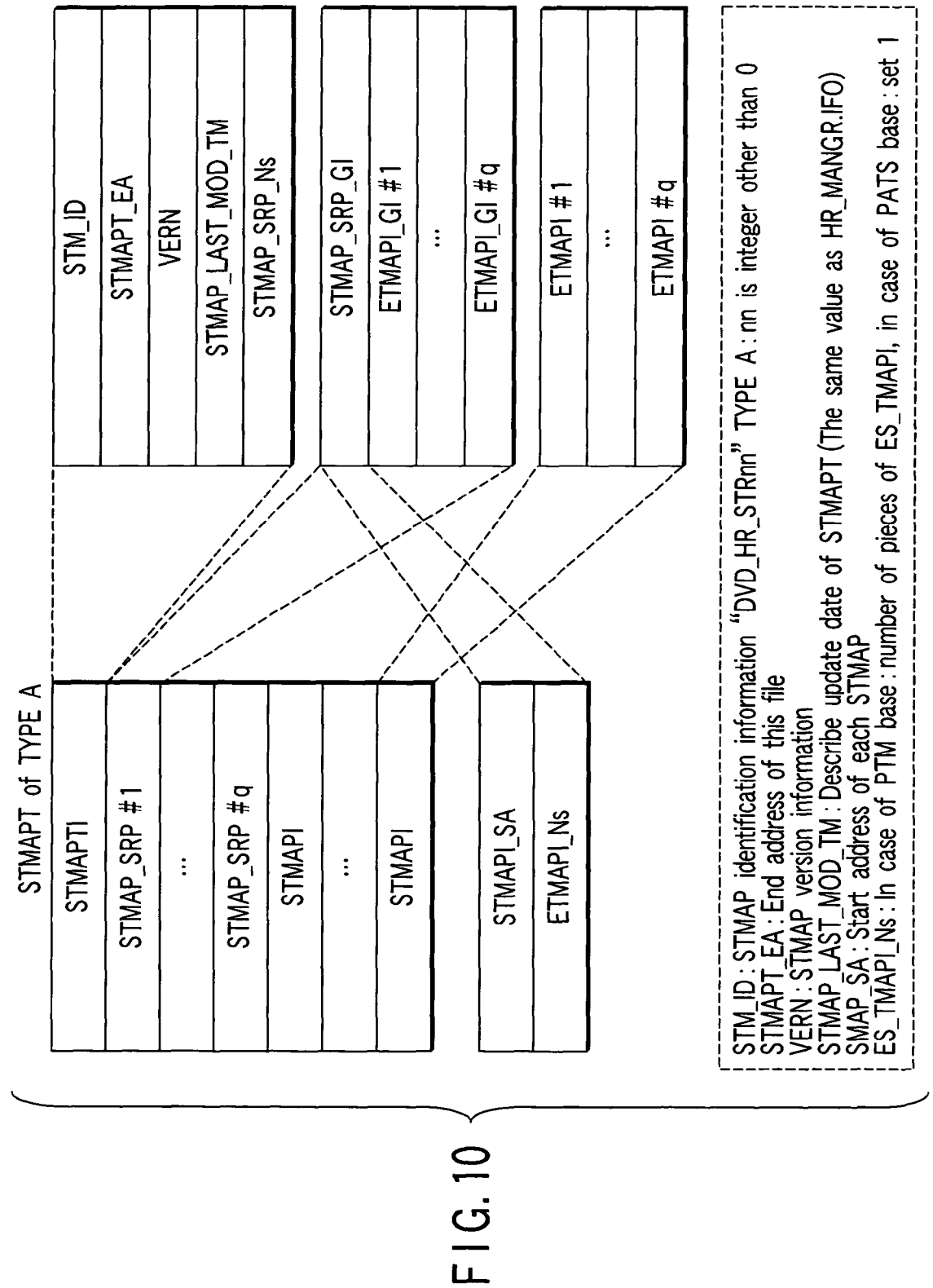
FIG. 10 is a view for explaining an example of the configuration of various kinds of information included in STMAPT (type A)
Figure 11:
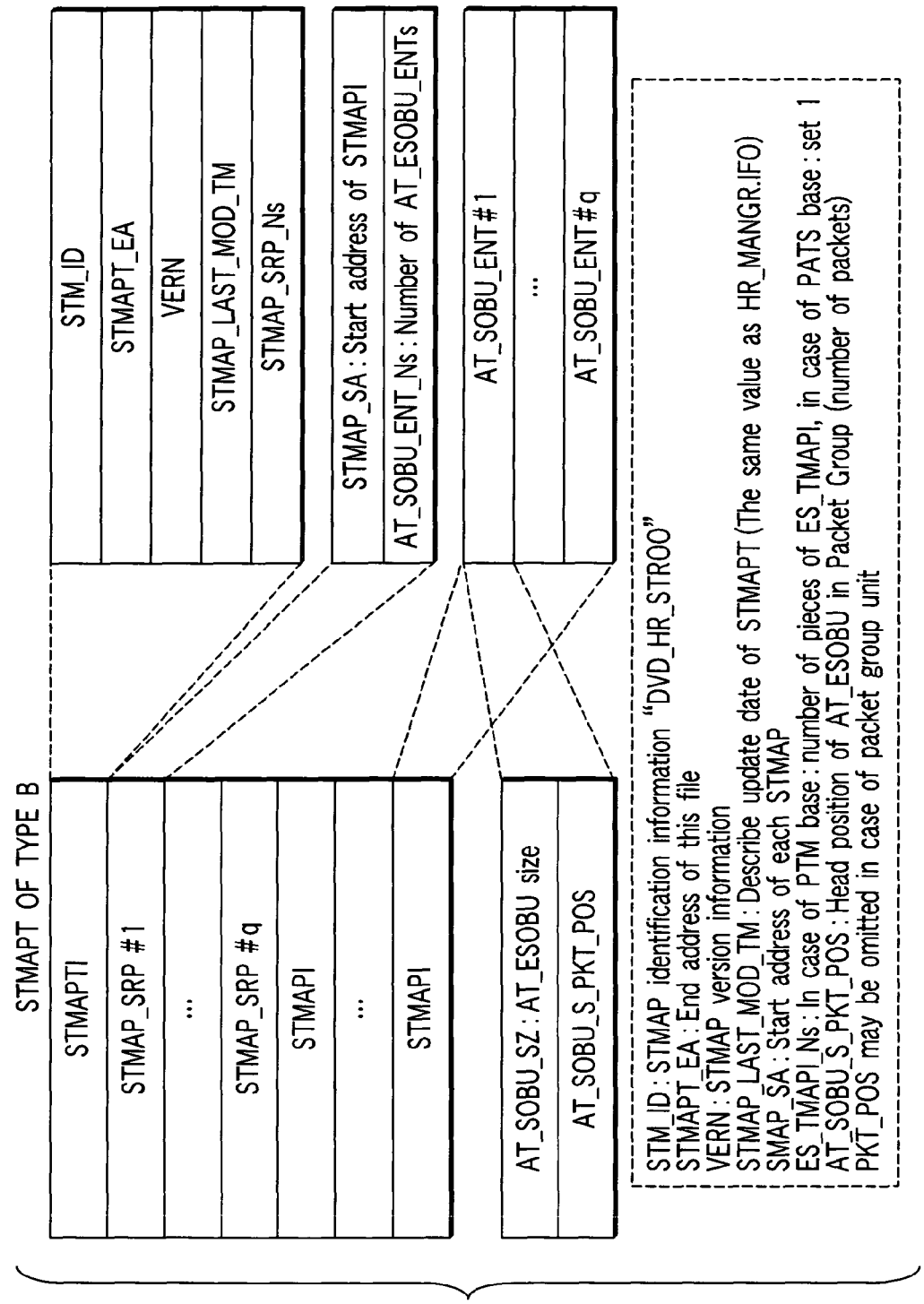
FIG. 11 is a view for explaining an example of the configuration of various kinds of information included in STMAPT (type B)

The STMAPTI (FIG. 10 or 11) includes the end address information of the STMAPT, version information of the TMAP of interest, STMAP_SRP_PNs (the number of pieces of TMAP_SRPI=the number of pieces of TMAPI), and update date information of the STMAP (the same value as that of VMGI). Each STMAP_SRP includes address information to STMAPI as an element of each STMAPT, and each STMAPI includes a number of pieces of ETMAPI_GI and a number of ESOBU_ENTs. The ETMAPI_GI includes ESOBU_ENT_Ns (the number of entries). Note that garbage data can be inserted among ESOBU_ENTs.

In case of the PATS base, the STMAPTI includes ESOBU_PATS_TM_RNG (ESOBU arrival time interval: 1=0.5 s, 2=1 s, or the count value in case of 27 MHz), ESOB_S_PATS/ESOB_E_PATS (arrival times of the first/last packet), and TM_OFS (a difference time from the TM range of the first ESOBU; not available in some cases). In this case, the edit process is made for respective ESOBUs, and adjustment is made using the PATS start/end time (CELLI).

Note that TMAPI information can be prevented from becoming extremely large by setting ESOBU/EVOBU_PB_TM_RNG even when a video recording time increases. However, since the time interval between neighboring entries broadens, it is more likely to disturb smooth double-speed playback and the like.

As for the ESOBU/EVOBU intervals, when the TM_RNG value is available, a time interval indicated by this value is set as approximately a maximum interval, and when a GOP division exists ahead of this time interval, ESOBUs are delimited there. On the other hand, if a sequence header (SH) and I-PIC exist, ESOBUs are delimited at the head of the SH.

The VTMAPT (FIG. 9) includes VTMAPTI, VTMAP_SRPT, and VTMAP#1 to VTMAP#n. The VTMAPTI includes VMG_ID (the same value as VMG_ID located at the head of VMGI), VTMAPT_EA (the end address of the VTMAP), VERN (version information of the TMAP), IFO_LAST_MOD_TM (update date information of the TMAPT; the same value as HR_MANGR.IFO), and VTMAP_SRPNs (the total number of pieces of search information). The VTMAP_SRPT includes one or more VTMAP_SRPs (search information of each VTMAP). Furthermore, each VTMAP_SRP includes VTMAP_SA (the start address of the VTMAP) and EVOBU_ENT_Ns (the total number of EVOBU_ENTs). The VTMAP includes one or more EVOBU_ENTs.

Figure 13:
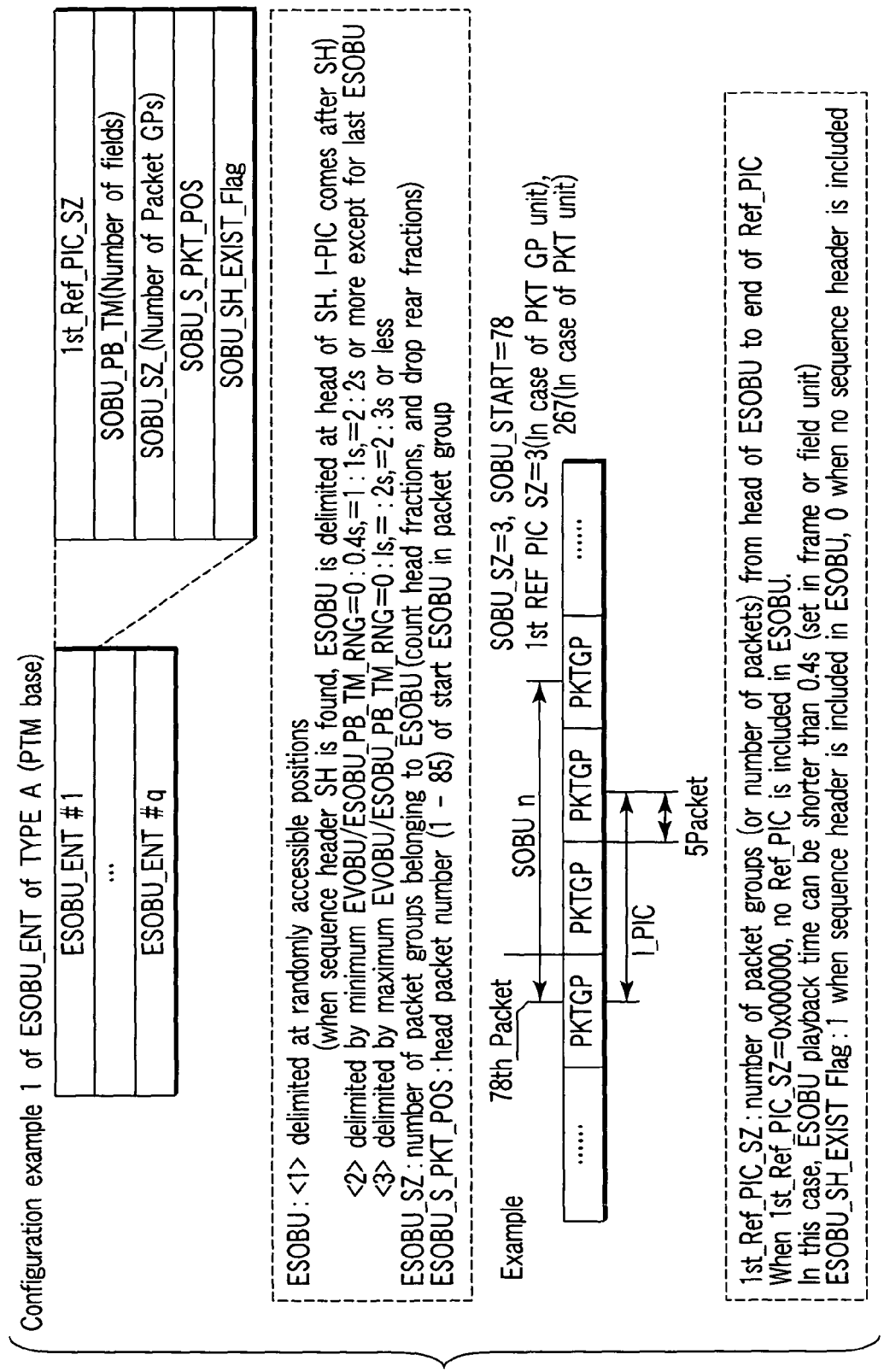
FIG. 13 is a view for explaining an example (example 1 of type A) of the configuration of the contents of an ESO-BU_ENT#.

As shown in FIG. 13, in case of a PTM base, the ESOBU_ENT includes 1st_RefPIC_SZ (end address information of the first reference picture (I-picture or the like) in the entry from the head of the ESOBU, which is expressed by LBs), ESOBU_PB_TM (the playback time of the ESOBU indicated by the number of fields), ESOBU_SZ (ESOBU size expressed by the number of packet groups that belong to the ESOBU), ESOBU_S_PKT_POS (the position, expressed by the number of packets from the head of a packet group, of a packet which stores the head of the ESOBU), and ESOBU_SH_EXIST_Flag (sequence header (SH) information).

There are two types of SH information. The first type of SH information corresponds to a case wherein flag ESOBU_SH_EXIST_FLAG indicating the existence of an SH in the ESOBU is available, as shown in FIG. 13. The second type of SH information corresponds to a case wherein flag ESOB_SH_I_EXIST_FLAG indicating the existence of an SH between the head of the ESOBU and I-PIC, and flag ESOBU_SH_EXIST_FLAG indicating the existence of an SH in the ESOBU (or the existence of an SH between I-PIC to the end of ESOBU) are available.

The first type of SH information is adopted when the SH is constant in a program (in the ESOB) or when the ESOBU is delimited so that the ESOBU starts from the SH. In this way, playback can be made using the SH in the ESOBU.

The second type of SH information is adopted when the SH changes frequently, or when the SH is not always located at the head of the ESOBU. By adopting the second type of SH information, if no SH is available from the head of the ESOBU to I-PIC, an SH can be set by reading out the previous ESOBU (normally, the immediately preceding ESOBU; however, in some cases, an ESOBU two or more ahead of the current ESOBU can be used) including the SH, thus allowing playback.

In case of time search, an ESOBU corresponding to a target time is calculated by accumulating PB_TM data, and the playback start PTM is converted into the number of fields from the head of that ESOBU. Note that the address is given by:

$$A = ESOB\_ADR\_OFS + ES\_ADR\_OFS \text{ of target } ES + \Sigma^{k-1}_{N=1} ESOBU\_SZ(N) \times 16 + 1$$

where K is the target ESOBU, and A is the target address. Furthermore, the first packet becomes a packet corresponding to the value of ESOBU_S_PKT_POS, and this address is accessed.

There are two types of ESOBU_ENTs on the PATS base, i.e., that in a packet unit and that in a packet group unit. In case of the packet unit, accurate addresses can be obtained, but the number of ESOBU_ENT data increases. On the other hand, in case of the packet group unit, the number of ESOBU_ENT data is small, but addresses can specify packet groups. In case of the packet unit, each ESOBU_ENT on the PATS base can be configured by AT_ESOBU_SZ and AT_ESOBU_S_PKT_POS. The AT_ESOBU_S_PKT_POS indicates the first packet position of the ESOBU by the number of packets.

On the other hand, in case of the packet group unit, each ESOBU_ENT on the PATS base can be configured by AT_ESOBU_SZ. In this case, ESOBU_S_PKT_POS and ESOBU_E_PKT_POS are fixed to zero.

Figure 7:
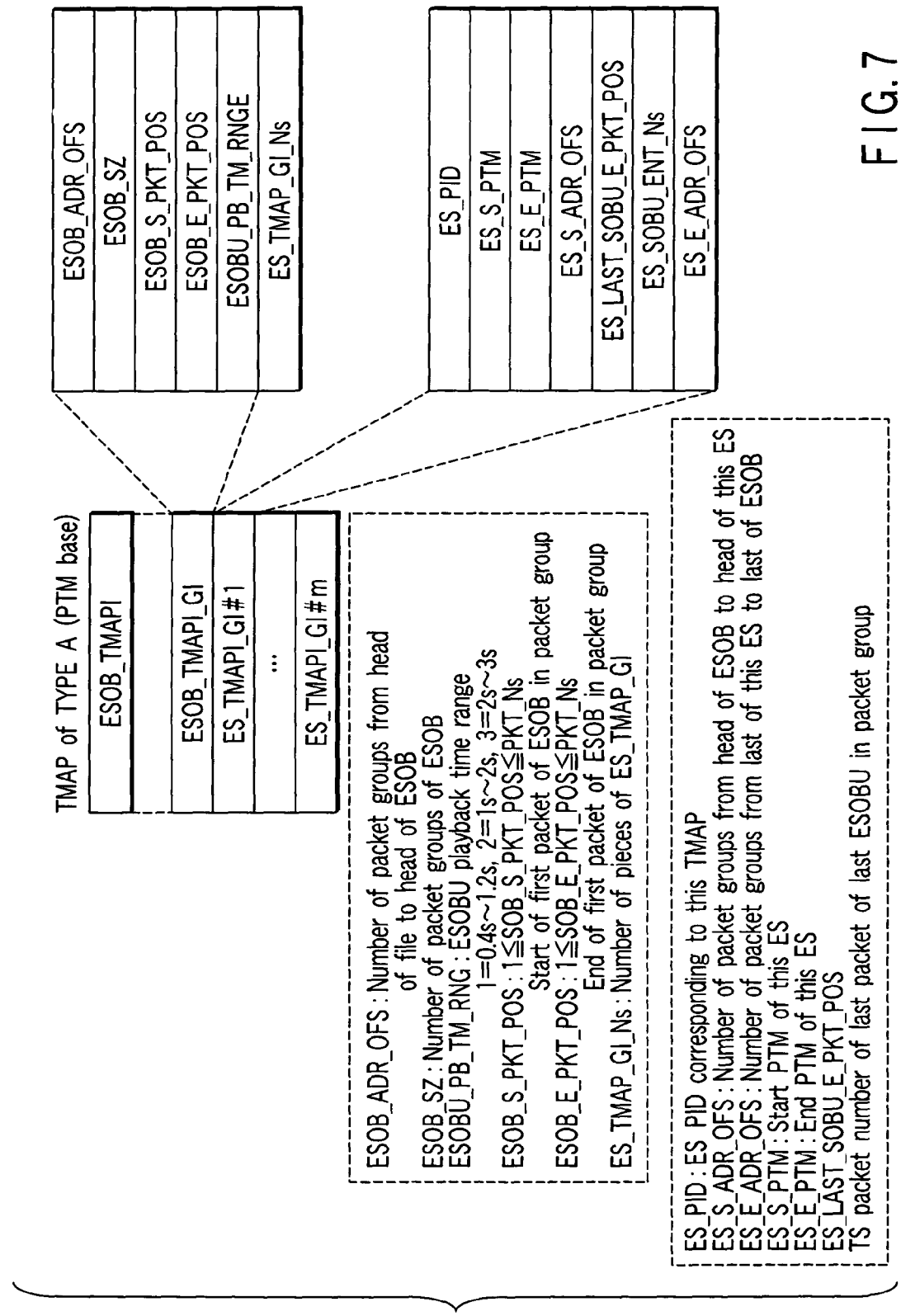
FIG. 7 is a view for explaining an example of the configuration of ESOB_TMAPI.

ESOB_TMAP_GI (FIG. 8) describes ADR_OFS, ESOB_SZ, and ESOB_E_PKT_POS as values associated with those of the ESOB. As TMAPI for each ES, ES_TMAPI (FIG. 7) describes ES_S_ADR_OFS (an address value (the number of packet groups) from the head of an ESOB to the first ESOBU of the ES of interest), ES_E_ADR_OFS (an address value (the number of packet groups) from the last ESOBU of the ES of interest to the end of the ESOB), ES_LAST_ESOBU_PKT_POS (the number of packets up to the last packet in a packet group of the last ESOBU), ES_E-SOBU_ENT_Ns (the total number of ESOBU_ENTs), the default PID of the ES of interest (there are two description methods of the PID: a method of describing the PID using 13-bit real data, and a method of describing the order in the PMT), and the like, as the values of the ES_TMAP.

Figure 12:
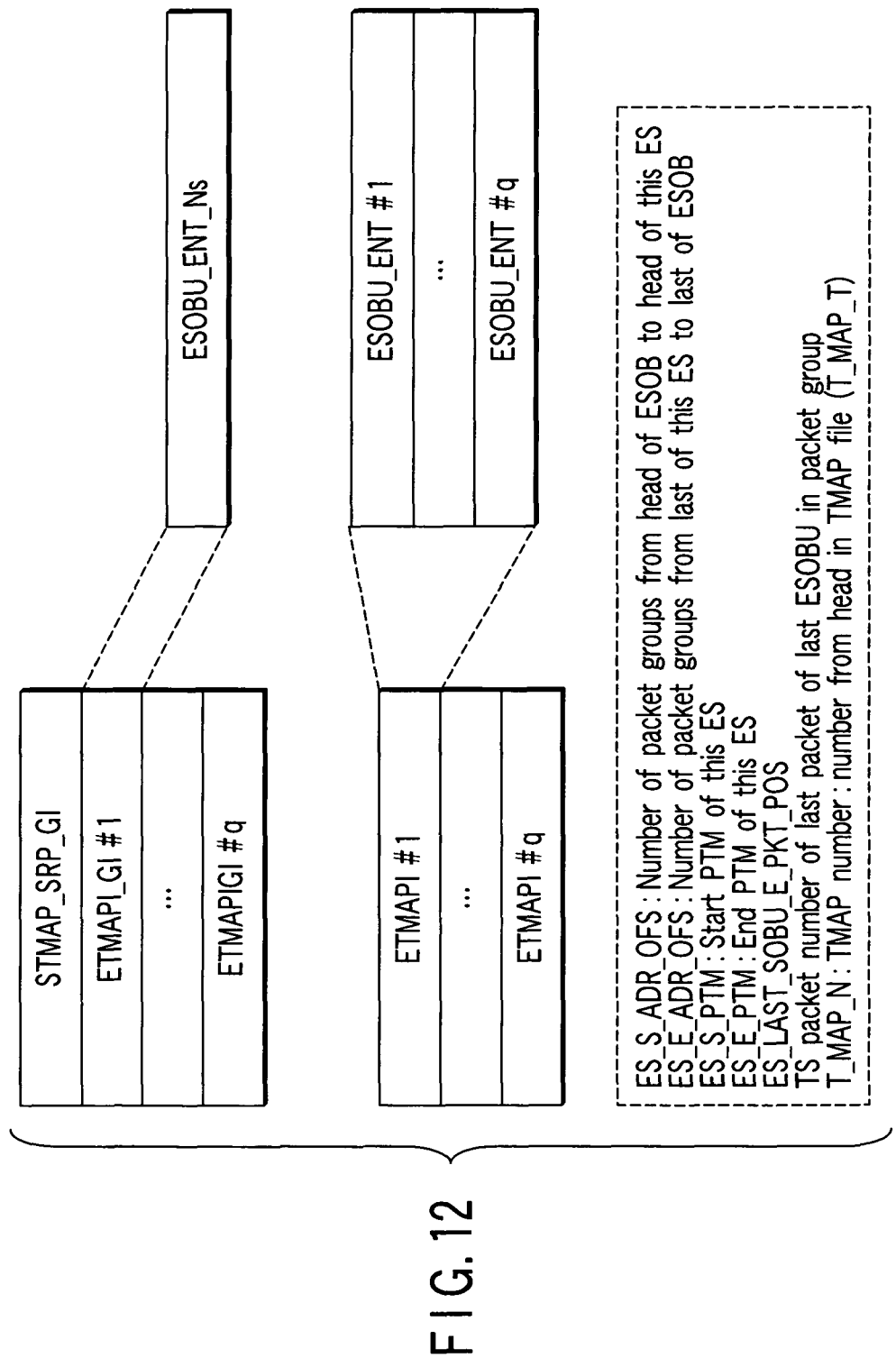
FIG. 12 is a view for explaining an example of information stored in ETMAPI_GI and ES_TMAPI#.

The ESOBU_ENT (FIGS. 12 and 13) in each STMAPI describes ESOBU_S_PKT_POS (or AT_ESOBU_S_PKT_POS) and ESOBU_SZ (or AT_ESOBU_SZ) as values which belong to the ESOBU.

Furthermore, when ESOB_SZ is available, ES_E_ADR_OFS (FIG. 7) need not be present since it can be calculated by:

$$ES\_E\_ADR\_OFS = ESOB\_SZ - (ES\_S\_ADR\_OFS + \Sigma^{k-1}_{N=1} ESOBU\_SZ(N) + 1)$$

Note that inequalities ESOB_SZ>ES_S_ADR_OFS, ESOB_SZ>ESOBU_SZ, and the like hold.

Figure 8:
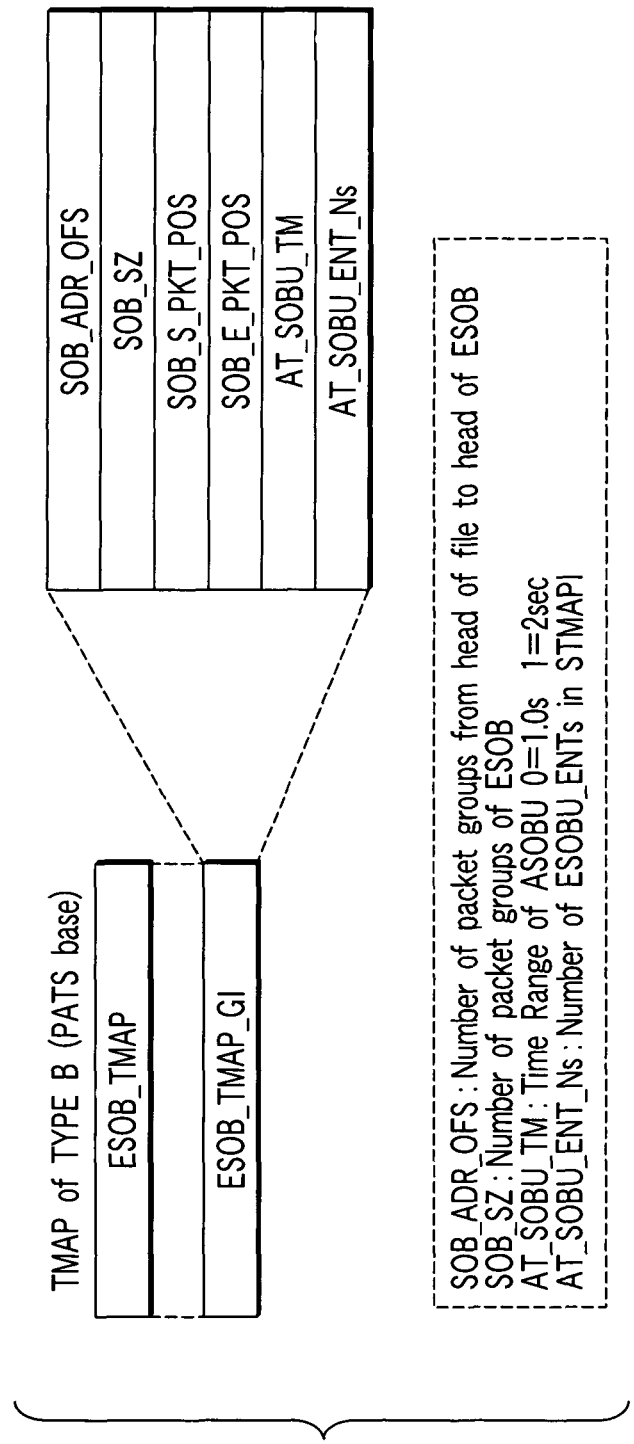
FIG. 8 is a view for explaining an example of the configuration of an ESOB_TMAP.

FIG. 8 shows the actual structures of the TMAP and ESOBU on the PATS base. In case of the packet unit, the ESOB_SZ (FIG. 8) indicates the number of packet groups from a packet group to which the first packet of the ESOB belongs to a packet group to which the last packet of the ESOB belongs. The AT_ESOBU_SZ is the number of packet groups from the first packet group of the ESOBU to the last packet group of the ESOBU. Also, the AT_ESOBU_S_PKT_POS represents the difference between the divisions of the ESOBU and packet group using the number of packets.

Note that the time information is expressed by PATS to have ESOB_S_PATS as the ESOB start time, and ESOB_E_PATS as the end time, since it is on the PATS base. However, the ESOB_E_PATS is the PATS (arrival start time) of the last packet of the last packet group, but is not the last reception end time. The edit process is done for respective ESOBUs, and the playback start time (CELL_S_PATS of CELLI) is designated. Since the edit process is done for respective ESOBUs, each ESOBU_S_PATS matches the head of the ESOBU. Note that the accuracy of the PATS is indicated by PATS_SS.

TM_OFS represents an actual difference between the first PATS of an ESOB and a TM (time) range designated by TM_RNG using approximately a 27-MHz count value. Note that an example without this value can be available.

When the processing is performed in the packet group unit, since the division of each ESOBU matches that of each packet group, the ESOBU_S_PKT_POS can be omitted. Also, ESOBU_S_PKT_POS and ESOBU_E_PKT_POS are fixed to zero.

Furthermore, the ESOB stores ESOB_ES_GPI (Group Information) to support multi-view broadcasting, rain attenuation broadcasting, and multi-program simultaneous video recording. That GPI includes ESOB_GPI_GI, GPI_SRPs, and GPI. The ESOB_GPI_GI stores GPI_TY (0=created within the recorder, 1=defined upon broadcast), and GPI_S-RP_Ns (the number of ES_GPI_SRPs). Each GPI_SRP stores GPI_SA (the start address of the GPI). Each GPI includes GPI_GI and ES_PIDs. The GPI_GI includes PRIORITY (priority: 0 if it is not designated, 1=top priority), and ES_PID_Ns (the number of ESs in the group of interest). If the video PID is stored, it does not belong to an identical or similar GP.

EX_PGC information as playback information has the same format as a normal VR format, and ORG_EX_PGC information is automatically generated by an apparatus upon video recording and is set in the order of video recording. UD_EX_PGC information is generated according to a playback order which is freely added by the user, and is called a playlist. These two formats have a common format in EX_PGC level, and that EX_PGC format is as follows. That is, EX_PG information saves update date information of this EX_PG. This information can identify when this EX_PG was edited. A program name as text information uses PRM_TXT, and an IT_TXT field saves other kinds of information (director name, leading actor name, . . . ) to save other kinds of text information. This EX_PGI is set with an SRP number of the IT_TXT field which saves these kinds of information to establish a link. Furthermore, a PG number is set in IT_TXT data. Note that the EX_PG number is an absolute number from the beginning of recording on this disc, and is an index number which remains unchanged even after other EX_PGs are deleted.

Furthermore, the EX_PG includes RSM_MRKI to provide a resume marker (a marker indicating the playback position upon interrupting playback) for each program. As information used to resume playback, an EX_CELL number, playback start PTM, and date information indicating the date of creation of that marker are set. This information is used as title resume.

In order to utilize MNFI provided to implement functions unique to the manufacturer, the EX_PGI is set with the SRP number of MNFI, and an EX_PG number can also be set in the MNFI information. In this way, links can be set with data in the MNFI information.

Furthermore, when PG update date information is set in both the MNFI and IT_TXT, whether or not the edit process has been made by an apparatus of another manufacturer can be verified by checking if these times match upon menu display.

In EX_CELL information, an ESOB type (STRA_CELL, STRB_CELL) is added to the VR cell type, and an ESOB number, start time, end time, and GP number to be played back are designated. The start and end times can be expressed by either the playback time (in case of PTM base) or PATS time (in case of PATS base).

When a time is designated by a playback time: real time upon playback, the same access method as in the VR is allowed. Since the user can designate using a playback time, a user's desire can be perfectly reflected. However, this method can be adopted when the stream contents can be sufficiently cognizable. If the contents cannot be sufficiently cognizable, a time is designated using a transfer time unit.

If designation is made using a playback time, playback cannot always be started from the head of I-picture data. If a frame at the playback start position is not that of I-picture, decoding starts from the preceding I-picture, and display starts when the target frame is decoded. In this way, a picture can be presented to the user as if playback were started from the designated frame.

As for a reference ID, a method of setting the PID (there are two description methods of the PID: a method of describing the PID using 13-bit real data, and a method of describing the order in the PMT; or the PID can be a component tag value) of a representative one of streams to be played back, and a method of setting the ID of a component group in case of multi-view TV or the like are available. Also, unique ID numbers are assigned to EX_PG and EX_CELL data, so that EX_PG and EX_CELL data can be designated using numbers which remain unchanged even when middle EX_PG and EX_CELL data are deleted.

The EX_CELL is set with the ESTR_FI number and ESOB number. Furthermore, the EX_CELL includes EPI (Entry Point Information) corresponding to each chapter. There are two types of EPI for each cell type, i.e., a total of eight types of EPI.

M_CELL_EPI_TY_A includes EPI_TY (EPI type information), and a PTM to which an EP is assigned. M_CELL_EPI_TY_B also includes PRM_TXTI (text information) and REP_PIC_PTM (thumbnail pointer). S_CELL_EPI_TY_A includes EPI_TY (EPI type information), and an S_EVOB_ENT number to which an EP is assigned. S_CELL_EPI_TY_B also includes PRM_TXTI (text information).

STR_A_CELL_EPI_TY_A (ESOB TYPE A) includes EPI_TY (EPI type information), a PTM to which an EP is assigned, and a PID (or group number) of an ES to which that EP is assigned. STR_A_CELL_EPI_TY_B also includes PRM_TXTI (text information) and REP_PIC_PTM (thumbnail pointer). STR_B_CELL_EPI_TY_A (ESOB TYPE B) includes EPI_TY (EPI type information), a PATS to which an EP is assigned, and a PID of an ES to which that EP is assigned. STR_B_CELL_EPI_TY_B also includes PRM_TXTI (text information) and REP_PIC_PTM (thumbnail pointer).

Figure 16:
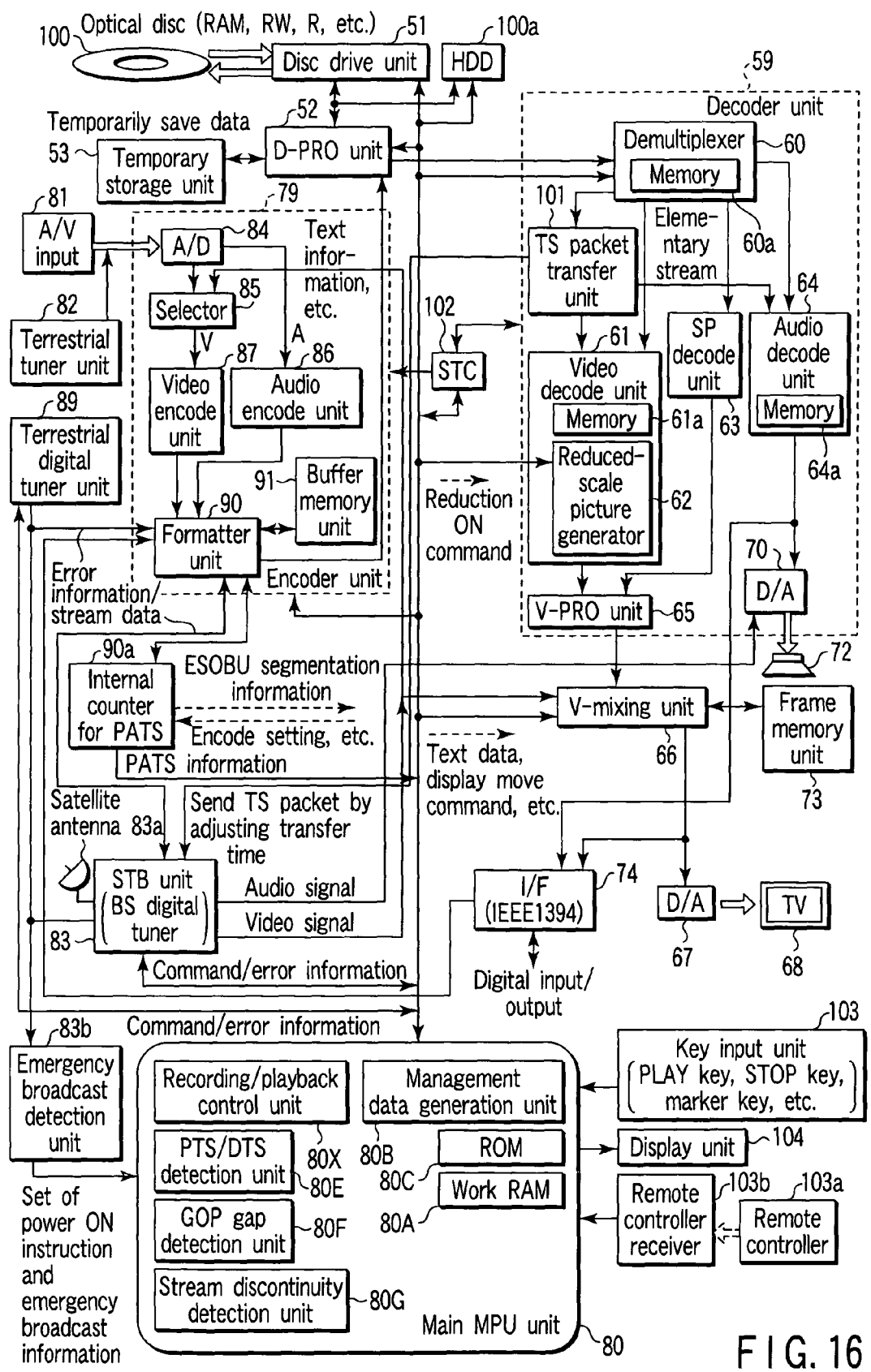
FIG. 16 is a block diagram for explaining an example of an apparatus for recording and playing back AV information (digital TV broadcast program and the like) on and from an information storage medium (optical disc, hard disc, or the like) using the data structure according to an embodiment of the invention.

FIG. 16 is a block diagram for explaining an example of the apparatus which records and plays back AV information (digital TV broadcast program or the like) on and from an information storage medium (optical disc, hard disc, or the like) using the data structure according to an embodiment of the invention.

As shown in FIG. 16, the recorder/player according to an embodiment of the invention comprises MPU unit 80, display unit 104, decoder unit 59, encoder unit 79, TV tuner unit 82, STC (System Time Counter) unit 102, D-PRO unit 52, temporary storage unit 53, disc drive unit 51, key input unit 103, V-mixing unit 66, frame memory unit 73, TV D/A unit 67, terrestrial digital tuner unit 89, IEEE 1394 I/F unit 74 (and/or Ethernet I/F unit), remote controller receiver 103b, STB unit (BS digital tuner or the like) 83, emergency broadcast detection unit 83b, and HDD unit 100a. This arrangement is configured by adding the functions of a streamer to a recordable/reproducible DVD recorder.

Note that an HDMI terminal and/or D3 to D5 terminals can be further equipped as an I/F in FIG. 16 (although not shown).

Encoder unit 79 includes A/D unit 84, video encode unit 87, audio encode unit 86, SP encode unit (not shown), formatter unit 90, and buffer memory unit 91. Decoder unit 59 includes demultiplexer 60, video decode unit 61, sub-picture (SP) decode unit 63, audio decode unit 64, TS packet transfer unit 101, V-PRO unit 65, and audio D/A unit 70. Furthermore, antenna 83a for receiving digital broadcast is connected to STB unit 83. Note that STC unit 102 is configured to count on a 27-MHz base.

The flow of signals upon recording is as follows. That is, TS packet data received by STB unit 83 (or terrestrial digital tuner 89) are packed into packet groups by formatter unit 90 and the packet groups are saved on work RAM 91. When the saved packet groups reach a predetermined size, they are recorded on disc 100 or HDD 100a.

PATS internal counter 90a is connected to this formatter unit 90. The arrival time of each TS packet is counted by PATS counter 90a, and that count value is appended to the head of each TS packet when the packet is buffered. This counter 90a can perform fine adjustment of count intervals by SCR (System Clock Reference) values, but does not load the SCR values unlike STC 102. As the operations to be executed at that time, upon reception of TS packets, a group is formed approximately every 170 packets, and a packet group header is generated. In this case, the upper 2 bytes of the PATS of the first packet of the packet group are stored in the header, and the lower 4 bytes of each of other PATS data are saved together with the TS packet (before the TS packet).

An analog signal input from terrestrial tuner 82 or line input 81 is converted into a digital signal by A/D unit 84. That digital signal is input to respective encoder units. That is, a video signal is input to video encode unit 87, an audio signal is input to audio encode unit 86, and text data of, e.g., teletext broadcasting is input to the SP encode unit. The video signal is compressed by MPEG, the audio signal is compressed by AC3 or MPEG audio, and the text data is compressed by runlength coding.

Each encoder unit (for VR) packetizes compressed data to form 2048-byte packets and inputs them to formatter unit 90.

Formatter unit 90 packs and multiplexes the packets as a program stream, and sends it to D-PRO unit 52. D-PRO unit 52 forms ECC blocks for approximately every 16 logical blocks, appends error correction data to them, and records the ECC packets on disc 100 via disc drive unit 51.

When disc drive unit 51 is busy due to seek, track jump, and the like, recording information is temporarily stored in buffer unit 53, until disc drive unit 51 is ready. Furthermore, formatter unit 90 generates each piece of segmentation information during video recording, and periodically sends it to MPU unit 80 (GOP head interrupt or the like). The segmentation information includes the number of packs of an EVOBU (ESOBU), the end address of I-picture data from the head of the EVOBU (ESOBU), the playback time of the EVOBU (ESOBU), and the like.

In the flow of signals upon playback, data are read out from disc 100 by disc drive unit 51, undergo error correction by D-PRO unit 52, and are then input to decoder unit 59. MPU unit 80 determines the type of input data (i.e., VR or SR data) (based on Cell TYPE), and sets that type in decoder unit 59 before playback.

In case of SR data, MPU unit 80 determines the PID to be played back based on cell information EX_CELLI to be played back, determines the PIDs of items (video, audio, and the like) to be played back based on a PMT, and sets them in decoder unit 59. In decoder unit 59, demultiplexer 60 sends TS packets to the respective decode units based on the PIDs. Furthermore, the TS packets are sent to TS packet transfer unit 101, and are transmitted to STB unit 83 (1394 I/F unit 74) in the form of TS packets.

The respective decode units execute decoding, and decoded data are converted into an analog signal by D/A unit 67, thus displaying data on TV 68. In case of VR data, demultiplexer 60 sends data to the respective decode units according to the fixed IDs. The respective decode units execute decoding, and decoded data are converted into an analog signal by D/A unit 67, thus displaying data on TV 68.

The features of medium 100 (100*a*) used in the apparatus of FIG. 16 will be briefly summarized below. That is, this medium has management area 130 and data area 131. Data is recorded on the data area as a plurality of object data (ESOB), and each object data includes a group of data units (ESOBU). One data unit (ESOBU) includes packet groups each of which is formed by converting a MPEG-TS compatible digital broadcast signal into TS packets and grouping a plurality of packets (see FIGS. 1 and 14). On the other hand, management area 130 has EX_PGC information (EX_PGCI) as information used to manage the playback sequence. This EX_PGC information includes EX_CELL information (EX_CI). Furthermore, management area 130 has information used to manage object data (ESOB).

The apparatus shown in FIG. 16 can make stream recording on medium 100 (100*a*) with the above data structure in addition to video recording. In this case, in order to extract program map table PMT and service information SI from a TS packet stream, MPU unit 80 has a service information extraction unit (not shown; firmware that forms management data generation unit 80B). Also, MPU unit 80 has an attribute information generation unit (not shown; firmware that forms management data generation unit 80B) that generates attribute information (PCR_pack number, PCR_LB count number, and the like) on the basis of information extracted by this service information extraction unit.

Furthermore, MPU unit 80 comprises, as firmware, detection unit 80E for detecting PTS (Presentation Time Stamp) and/or DTS (Decoding Time Stamp) data from an MPEG-TS, detection unit 80F for detecting an interval between continuous (neighboring) GOP data, detection unit 80G for detecting if a stream is discontinuous, and the like.

Upon playback, pack data read out from disc 100 are parsed by demultiplexer 60. Packs that store TS packets are sent to TS packet transfer unit 101, and are then sent to the decoders, thus playing back data. When pack data are transferred to STB unit 83 (or are transmitted to an external apparatus such as a digital TV or the like), TS packet transfer unit 101 transfers TS packets at the same time intervals as they arrived. STB unit 83 decodes to generate an AV signal, which is displayed on the TV via the video encoder unit in the streamer.

For example, when the power switch of the apparatus in FIG. 16 is turned on, MPU unit 80 makes initial settings (upon factory shipment or after user's settings). MPU unit 80 also makes display settings and waits for a user's operation. If the user has made a key input from key input unit 103 or remote controller 103*a*, MPU unit 80 interprets the contents of that key input. The following data processes are executed as needed in accordance with this input key interpretation result. That is, if the key input is, for example, a key operation made to set timer program recording, a program setting process starts. If the key input is a key operation made to start video recording, a video recording process starts. If the key input is a key operation made to start playback, a playback process starts. If the key input is a key input made to output digital data to the STB, a digital output process starts. If the key input is a key operation of an edit process, the edit process starts.

The aforementioned processes are parallelly executed as needed for respective tasks. For example, the process for outputting digital data to the STB is parallelly executed during the playback process. Or a new program setting process can be parallelly executed during the video recording process which is not timer program recording. Or by utilizing the feature of disc recording that allows high-speed access, the playback process and digital output process can be parallelly executed during the video recording process. Also, the disc edit process can be executed during video recording on the HDD.

Figure 17:
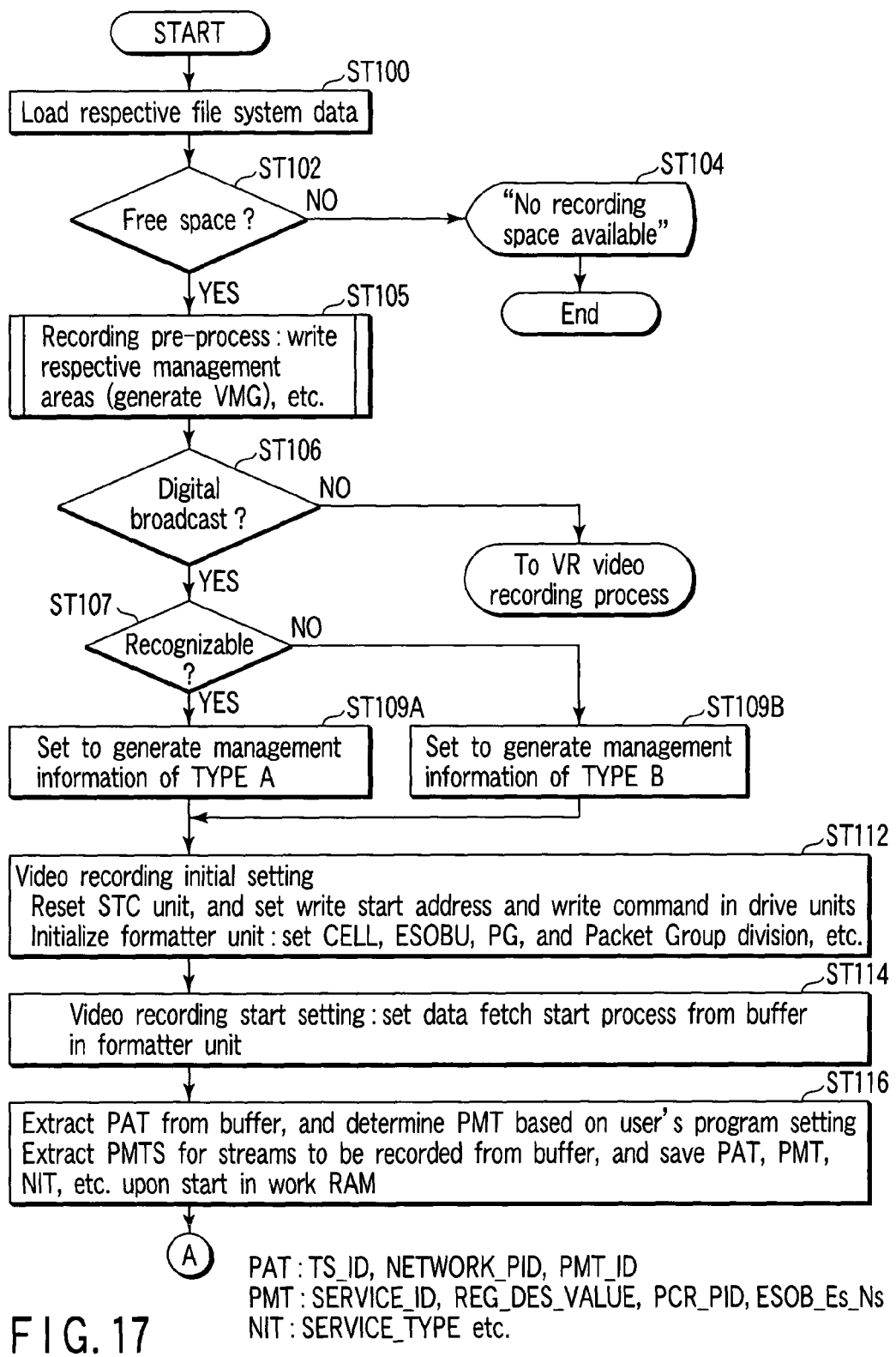
FIG. 17 is a flowchart for explaining an example of a video recording operation (part 1)
Figure 18:
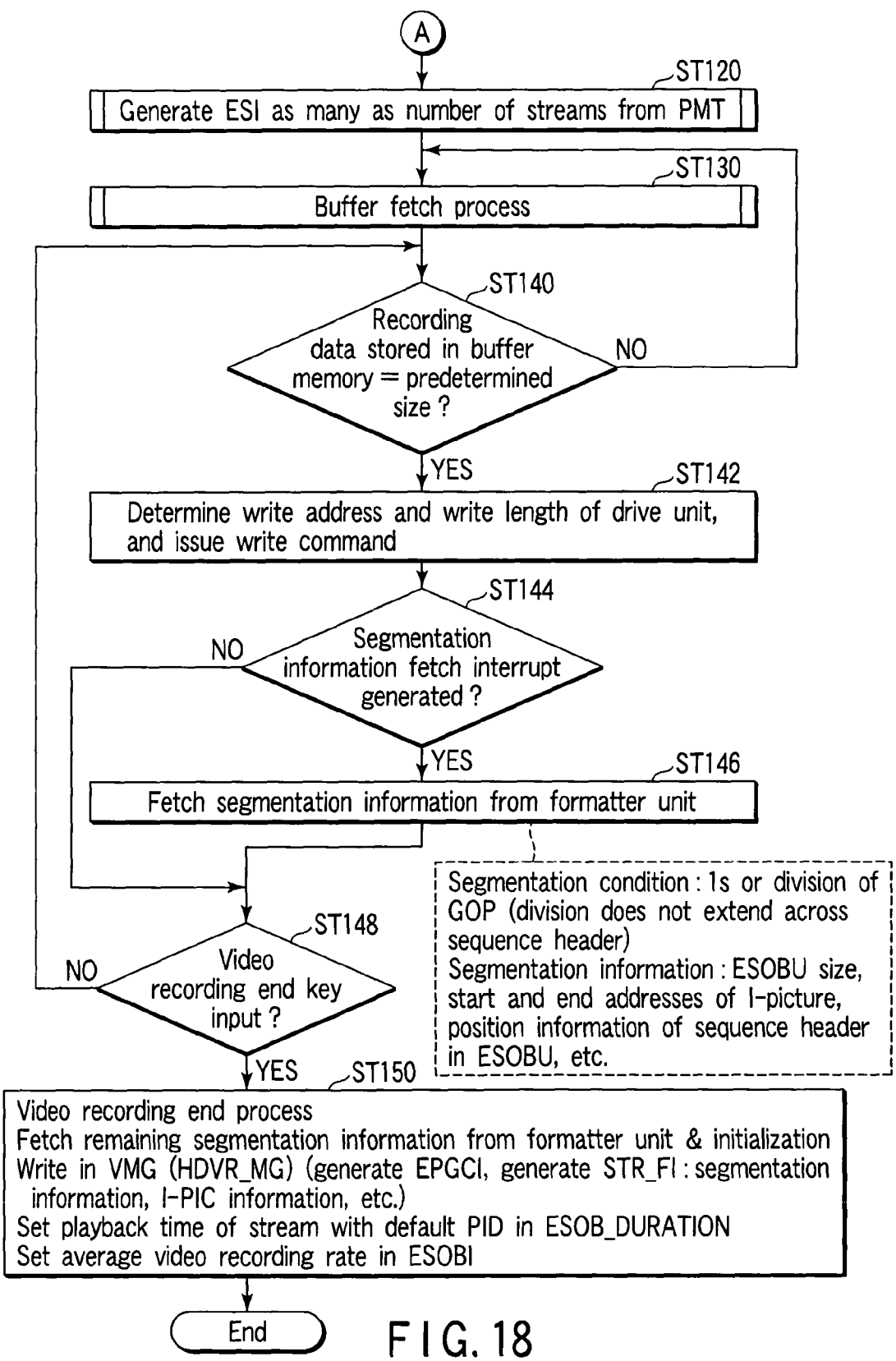
FIG. 18 is a flowchart for explaining an example of a video recording operation (part 2)

FIGS. 17 and 18 are flowcharts for explaining an example of the video recording operation of the apparatus in FIG. 16. Data processes upon stream recording are as follows.

d1) A program to be recorded is determined using EPG (Electronic Program Guide) in the program setting process, reception of that program starts, and the determined program is recorded.

d2) Upon reception of a recording command from the key input unit, the MPU unit loads management data from the disc drive unit and determines a write area. At this time, the MPU unit checks the file system (step ST100) to determine whether or not to proceed to recording (step ST102). If it is possible to proceed to recording, the MPU unit determines a recording position (step ST105); otherwise, the MPU unit displays a message that advises accordingly (step ST104), thus aborting the process.

d3) If data to be recorded is digital broadcast data (step ST106) and if no error is found (step ST111), contents of the management area are set to write data in the determined area, and the write start address of video data is set in the disc drive unit, thus preparing for data recording (step ST112).

d4) The time of the STC unit is reset. Note that the STC unit is a system timer, and recording/playback is done with reference to this timer value.

d5) The PAT of a program to be recorded is loaded to determine the PID used to fetch the PMT of the target program. Then, the target PMT is loaded to determine the PIDs of data (video, audio) to be decoded (to be recorded). At this time, the PAT and PMT are saved in the work RAM unit of the MPU unit, and they are written in the management information. At this time, VMG file data is written in the file system, and information is written in VMGI.

d6) Video recording settings are made in respective units (step ST114). At this time, a segmentation setting of data and a reception setting of TS packets are made in the formatter unit. Also, the PID of data to be recorded is set to record a target video stream. Furthermore, the buffer is set to start holding of TS packets (step ST116). Then, the formatter unit 90 starts its operation.

d7) ESOB_ESI is generated based on the PMT (step ST120).

d8) If data stored in the buffer reaches a predetermined size, an ECC process is done via the D-PRO unit, thus recording the data on the disc (step ST130).

d9) During video recording, segmentation information is saved in the work RAM of the MPU unit periodically (before the buffer RAM of the formatter unit becomes full of data). The segmentation information to be saved is ESOBU segmentation information, which includes the ESOBU start address, ESOBU pack length, I-Pic end address, the ESOBU arrival time (PATS), or the like.

d10) It is checked if video recording is to end (if the user has pressed a video recording end key or if no recordable space remains). If video recording is to end, remaining segmentation information is fetched from the formatter unit, and is added to the work RAM. These data are recorded in management data (VMGI), and the remaining information is recorded in the file system.

d11) If video recording is not to end, the control returns to d7) to continue the data fetch and playback processes.

In the flow of signals upon recording, MPEG-TS packet data received by the STB unit (or terrestrial digital tuner) are converted into packet groups by the formatter unit, and the packet groups are saved in the work RAM. When data stored in the work RAM reach a predetermined size (for one or an integer multiple of CDA size), they are recorded on the disc.

As the operations at that time, upon reception of TS packets, a group is formed approximately every 170 packets, and a packet group header is generated. More specifically, this operation is executed as follows.

1) A TS packet is received.
2) If the fetched TS packet includes a PCR, the STC unit is corrected.
3) If the packet of interest corresponds to the head of a packet group, Sync_Pattern: 00ffa5a5 is set; otherwise, the control advances to 6).
4) PATS data is used as the arrival time of the TS packet, the lower 4 bytes of the PATS data are allocated before that TS packet, and the upper 2 bytes of the first PATS data are set in the packet group header as FIRST_PATS_EXT.
5) Zero is set in PATS_SS, and the control advances to 7).
6) In the TS packet fetched in the TS packet data area, the lower 4 bytes of the PATS data are appended before that TS packet, and the TS packet is set in a packet group data area.
7) It is checked if a packet group is formed (if 170 TS packets are grouped). If a packet group is not formed yet, the flow returns to 1). If the packet group is formed, a PKT_GRP_GI setting process, CCI process, and MNFI process are executed, and group data are temporarily saved in the buffer RAM. In this case, if the PATS accuracy is 4 bytes, FIRST_PATS_EXT in the processes 4) and 5) are omitted (or zero is set), and the PATS_SS value is set to be 01.

The PKT_GRP_GI setting process will be described below.

1) The packet type is checked. If the packet type indicates an MPEG-TS packet, 1 is set; otherwise, a value suited to that type is set in Packet Type.
2) A value corresponding to the BOOK version of the standard of interest is set in VERSION.
3) It is checked if the PATS has reached an end (wraparound) in the packet group of interest. If the PATS has reached an end, that address information is set in the PATS_WRAPI in the ESOB_PATSI.

The data processes upon video recording are as follows.

1) A program to be recorded is determined using EPG (Electronic Program Guide) in the program setting process, reception of that program starts, and the determined program is recorded.
2) Upon reception of a recording command from the key input unit, the MPU unit loads management data from the disc drive unit and determines a write area. At this time, the MPU unit checks the file system to determine whether or not to proceed to recording. If it is possible to proceed to recording, the MPU unit determines a recording position; otherwise, the MPU unit displays a message that advises accordingly, thus aborting the process.
3) The contents of the management area are set to write data in the determined area, and the write start address of video data is set in the disc drive unit, thus preparing for data recording.
4) The time of the STC unit is reset. Note that the STC unit is a system timer, and recording/playback is done with reference to the this timer value.
5) The PATS of a program to be recorded is loaded to determine the PID used to fetch the PMT of the target program. Then, the target PMT is loaded to determine the PIDs of data (video, audio) to be decoded (to be recorded). At this time, the PAT and PMT are saved in the work RAM unit of the MPU unit, and they are written in the management information. At this time, VMG file data is written in the file system, and information is written in VMGI.
6) Video recording settings are made in respective units. At this time, a segmentation setting of data and a reception setting of TS packets are made in the formatter unit. Also, the PID of data to be recorded is set to record a target video stream. Furthermore, the buffer is set to start holding of TS packets. Then, formatter unit 90 starts its operation.
7) ESOB_ESI is generated based on the PMT.
8) If data stored in the buffer reaches a predetermined size, an ECC process is done via the D-PRO unit, thus recording the data on the disc.
9) During video recording, segmentation information is saved in the work RAM of the MPU unit periodically (before the buffer RAM of the formatter unit becomes full of data). The segmentation information to be saved is ESOBU segmentation information, which includes the ESOBU start address, ESOBU pack length, I-Pic end address, playback time, the ESOBU arrival time (PATS), the presence/absence of sequence header information, or the like.
10) It is checked if video recording is to end (if the user has pressed a video recording end key or if no recordable space remains). If video recording is to end, remaining segmentation information is fetched from the formatter unit, and is added to the work RAM. These data are recorded in management data (VMGI), the average recording rate upon video recording is recorded, and the remaining information is recorded in the file system.
11) If video recording is not to end, the control returns to d7) to continue the data fetch and playback processes.

In order to display on the TV, data is sent to decoder unit 59 simultaneously with the D-PRO unit, and is played back. In this case, the MPU unit makes settings upon playback in the decoder unit, which then automatically executes a playback process. The D-PRO unit forms ECC groups by combining approximately every 16 packs, appends ECC data to each group, and sends them to the disc drive unit. When the disc drive unit is not ready to record on the disc, the D-PRO unit transfers the ECC groups to the temporary storage unit and waits until the disc drive unit is ready to record. When the disc drive unit is ready, the D-PRO unit starts recording. As the temporary storage unit, a large-capacity memory is assumed since it holds recording data for several minutes or longer by high-speed access. Note that a microcomputer can make read/write access to the D-PRO unit via a dedicated microcomputer bus, so as to read/write the file management area and the like.

The ESOB_ESI setting process is executed, for example, as follows.

1) PSI and SI are examined to check the number of set streams.

2) 4) and 5) are repeated in correspondence with the number of set streams.

3) A stream type is checked based on PSI and SI to determine if the stream of interest is a video/audio stream or another type of stream to branch the control to the next stream check processes.

4) The stream type is categorized to MPEG1 video, MPEG2 video, MPEG1 audio, MPEG2 audio, . . . , and internal data are checked depending on the determined type to read out respective kinds of attribute information.

5) In case of a video stream, ES_TY=0, and respective kinds of attribute information are set (especially, resolution data, aspect information, and the like are extracted) to generate V_ATR. The control then advances to 8).

6) In case of an audio stream, ES_TY=0x40, and respective kinds of attribute information are set (especially, the sampling frequency, the number of channels, and the like are extracted) to generate A_ATR. The control then advances to 8).

7) In case of another kind of stream, ES_TY=0x80, and respective kinds of attribute information are set. The control then advances to 8).

8) Copy information is extracted to generate CP_CTL_INFO.

9) New ESI is set based on the attribute information, and the control returns to check the next stream.

Furthermore, the STR_FI process is executed, for example, as follows.

1) The number of search pointers (SRP) is increased by one to assure an area, so as to add another ESOBI, and 0: MPEG_TS is set in PKT_TY.

2) The video recording time is set in ESOB_REC_TM. Note that the internal clock is set and corrected based on a TDT (Time Data Table), so that an accurate time can be obtained.

3) Start and end PTMs are set.

4) If the stream type is a TS stream (ARIB, DVB), "188" is set in AP_PKT_SZ and "16" is set in PKT_GRP_SZ; otherwise, a value corresponding to the broadcast scheme is set in AP_PKT_SZ.

5) MPEG_TS is set in PKT_TY.

6) TS_ID, NETWORK_PID, and PMT_ID (the PID of PMT data used by the ESOB of interest: there are two description methods of the PID: a method of describing the PID using 13-bit real data, and a method of describing the order in the PMT) are set based on PAT data.

7) Program_Number (SERVICE_ID in PMT) and PCR_PID are set based on PMT data. Furthermore, as for FORMAT_ID and VERSION, default values in the apparatus (in case of the built-in tuner) or Registration_Descriptor values sent via a digital input (in case of an external digital input) are set. ESOB_TY is set on the basis of the TMAP type.

8) Moreover, the number of recorded ESs is set. (The PMT is set with information: the number of all broadcasted ESs, but since not all ESs are always recorded upon video recording, the number of recorded ESs is set.)

9) The video recording start LB address is set in ADR_OFS, and a default PID is set. Note that the default video PID corresponds to that with a component tag value "00" or that of a stream corresponding to a component tag described in a main component group in case of multi-view TV.

10) A GPI setting process (to be described later), and the like are executed, and TMAPI is generated for each stream on the basis of each segmentation information.

11) PATS_SS is set according to the PATS accuracy (the same value as that in the packet group header).

12) An edit date is set.

The GPI setting process is executed, for example, as follows.

1) A stream type is checked.

2) If a plurality of programs form one stream, information indicating the presence of GPI is set in ESOB_TY, GPI_TY=0, PRIORITY=0 for all programs, one GPI is generated per program, and the number of groups is set. The flow then advances to 5).

3) In case of rain attenuation broadcasting, information indicating the presence of GPI is set in ESOB_TY, GPI_TY=40 h, the top layer is set to be PRIORITY: 1, and other layers are set to be PRIORITY: 2. One GPI is generated per layer, and the number of groups is set. The flow then advances to 5).

4) In case of multi-view broadcasting, information indicating the presence of GPI is set in ESOB_TY, GPI_TY=40 h, the top layer is set to be PRIORITY: 1, other layers are set to be PRIORITY: 2, and one GPI is generated per view. It is checked if ESs to form another GP still remain. If such ESs still remain, the control returns to 1); otherwise, the number of groups is set, and the control advances to 5).

5) It is checked if another group remains. If such group remains, the control returns to 2); otherwise, a playlist is generated and registered based on the PID of the currently selected group, thus ending this process.

6) If no GP is available, information indicating the absence of GPI is set in ESOB_TY, and this process ends. In this way, if playback is made using the currently selected group, the automatically generated playlist can be played back.

Furthermore, the TMAP setting process will be described below.

1) The ESOB/EVOB structure is determined.

2) In case of the ESOB, TMAP_TY is determined. If this ESOB is on the PTM base, ESs used to generate an STMAP are determined in consideration of the number of GPs, the number of ESs (the number of video ESs) is set as the number of TMAPs, and ES_PID to be generated is set for each TMAP. (However, one TMAP may not always be assigned to one GP. If no TMAP is available, another TMAP of the MAIN_GP or a GP with an identical or similar GP_NUM is used to implement playback, search, special playback, and the like.) On the other hand, in case of an ESOB on the PATS base or EVOB, one TMAP is added.

3) The ESOB (PTM base)/EVOB start and end times, the start and end times for each TMAP, the number of entries, the arrival time of the first packet of the ESOB (PATS base), the arrival time of the last packet of the ESOB, and the like are set based on segmentation information.

4) A TMAPT is added, and the following entry information is set based on segmentation information. That is, in case of the ESOBU of TYPE A, 1st_REF_PIC_SZ (the end address of the first I-Pic; 0 is set if no I-Pic is available), ESOBU_SZ (indicating the ESOBU size by a packet GP unit), ESOBU_S_PKT_POS (the first packet position of the ESOBU in a packet group), ESOBU_SH_EXIST_FLAG (indicating the presence of a sequence header in the ESOBU; present=1, none=0), ESOBU_SH_I_EXIST_FLAG (indicating the presence/absence of a sequence header from the head of the ESOBU to I-PIC; present=1, none=0:0 is set if no I-Pic is available), and the like are set. In case of the ESOBU of TYPE B, ESOBU_SZ (indicating the ESOBU size by a packet GP unit) and ESOBU_S_PKT_POS (the first packet position of the ESOBU in a packet group (PKT unit)) are set.

5) ESOBU_SZ and ESOBU_PB_TM are generated. Note that the TMAPT information is stored as an independent file or is added to the end of the IFO file.

The EVOB/ESOB structure setting process is executed, for example, as follows.

1) The recorded time is checked. If the recorded time is equal to or shorter than two hours, the control advances to 2); if it falls within the from approximately two to approximately four hours, the control advances to 3); or if it is equal to or longer than approximately four hours, the control advances to 4).

2) "0" is set in EVOBU/ESOBU_PB_TM_RNG, and EVOBU/ESOBU_ENT data are generated based on segmentation information (information of 0.4 s to 1.0 s) so that each ESOBU has a time range of approximately 0.4 s to approximately 1 s. The control then advances to 5).

3) "1" is set in EVOBU/ESOBU_PB_TM_RNG, and EVOBU/ESOBU_ENT data are generated based on segmentation information (information of 0.4 s to 1.0 s) so that each ESOBU has a time range of approximately 1 s to approximately 2 s. The control then advances to 5).

4) "2" is set in EVOBU/ESOBU_PB_TM_RNG, and EVOBU/ESOBU_ENT data are generated based on segmentation information (information of 0.4 s to 1.0 s) so that each ESOBU has a time range of approximately 2 s to approximately 3 s. The control then advances to 5).

5) This process ends.

The CP_CTL_IFO setting process is executed, for example, as follows.

1) It is checked if the latest PMT and EIT include copy information. If copy information is included, copy information is formed and set based on that information. The control then advances to 3).

2) If no copy information is included, "copy free" is set.

3) It is checked if the latest PMT and EIT include contents use descriptors. If the contents use descriptors are included, ICT and EPN are set based on that information.

4) If the received TS packet does not include any copy information, ICT and EPN are formed as "copy free".

The CCI setting process will be described below.

1) It is checked if the latest PMT and EIT include copy information. If copy information is included, copy information is formed and set based on that information. The control then advances to 3).

2) If the received TS packet does not include any copy information, the same information as that in the previous pack is formed as copy information.

3) It is checked if the latest PMT and EIT include contents use descriptors. If the contents use descriptors are included, the following process is made. That is, if the values of the contents use descriptors have changed in the middle of a packet group, dummy data is inserted in the previous packet group to form a new packet group after the changed position, and CCI is set based on that information. At this time, 1 is set in PKT_GRP_GI: STUF, and the number of valid packets is set in PKT_GRP_GI:VALID_PKT_Ns.

4) If the received TS packet does not include any copy information, CCI is formed as "copy free".

The PGC generation process is executed, for example, as follows.

1) It is checked if a disc of interest undergoes the first video recording. If the disc of interest undergoes the first video recording, new ORG_PGC is generated; otherwise, a setting is made to add PG after the ORG_PGC.

2) Erase permission: 0 is set in PG_TY, and the number of cells is set in Cell_Ns.

3) In case of ARIB, if language_code in a short event descriptor in an EIT is "jpn", "0x12" is set in CHR in VMG_MAT, EVENT_NAME is set in the second field of PRM_TXTI, and representative picture information is set in REP_PICTI.

4) The manufacturer ID of this apparatus is set in LAST_MNF_ID. As for this value, when PGI, Cl, or EVOB has been changed, the manufacturer ID of the apparatus used to change such information is set to identify the manufacturer of the last apparatus used to execute edit and record processes. With this manufacturer ID, when the apparatus of another manufacturer is used to change the recorded contents of a disc, an appropriate measure can be easily taken.

5) The absolute number of PG is set in PG_INDEX to allow another application software or the like to refer to each PG. Furthermore, this PG update date information is recorded. At this time, if MNFI and/or IT_TXT (with the same manufacturer code) supported by this apparatus are/is found, the update date information of corresponding data is also set.

6) Information unique to each manufacturer is set in MNFI.

7) Information indicating a streamer is set in CELL_TY (CELLI).

8) The reference ESOB number is set, the representative (video) PID or Component_Group_Id is set as the ID to be played back, and the number of pieces of EPI, playback start and end PTMs, and EPs are set.

9) Start information is set in PG_RSM_INF so that playback can start from the head of the program. The factors of automatic EP assignment in the video and time relationships are a constant time and a video mode change (an aspect ratio, and large motion vectors), and the first packet (Unit Start Indicator) of a video frame and that (the first packet of a sequence header, the first packet of I-PIC) of a GOP are combined with these conditions. Furthermore, the factors of automatic EP assignment in the audio relationship are a change in audio (a change in audio volume or the like)/audio mode (ST/MONO), and the first packet (Unit Start Indicator, frame header) of an audio frame is combined with these conditions.

Figure 19:
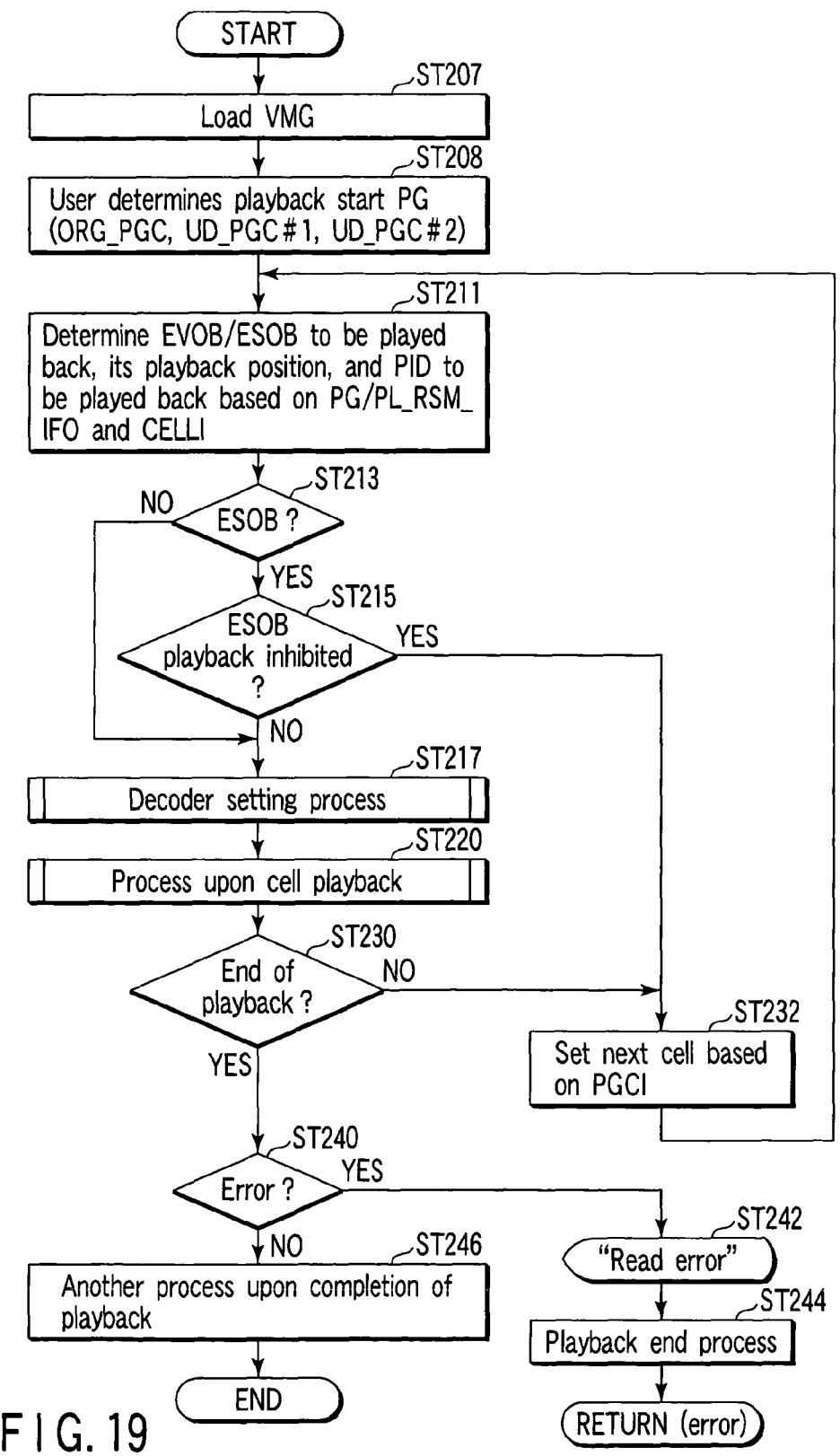
FIG. 19 is a flowchart (overall playback operation flow) for explaining an example of a playback operation.

The data processes upon playback are executed, for example, as follows (see FIG. 19).

1) A disc check process is made first to check if the disc of interest is a rewritable disc (R, RW, RAM). If the disc of interest is not a rewritable disc, a message that advises accordingly is returned, and the process ends.

2) The file system of the disc is read out to check if data has already been recorded. If no data is recorded, a message "no data is recorded" is displayed, thus ending the process.

3) The VMG file is loaded (step ST207), and programs and cells to be played back are determined (selected by the user).

In this case, if a playback process in the recorded order is selected, playback is made according to ORG_PGCI; if a playback process for each program is to be made, playback is made according to UD_PGC with a number corresponding to the program to be played back.

4) The value of PKT_TY is read out to check if a broadcast scheme is supported. If the broadcast scheme is unsupported, a message that advises accordingly is displayed, and the process ends (or the control advances to process the next cell).

5) The ESOB/EVOB to be played back, playback start PTM, and the like are determined based on title information, resume information (PL_RSM_IFO, PG_RSM_IFO) to be played back, and the like, and a playback start file pointer (logical address) is determined based on the playback start PTM. Furthermore, respective decoder units are set based on STI and ESI values to prepare for playback. Also, APS settings (e.g., APS=ON/OFF, APS type, and the like) are set in the video decoder based on CCI in the packet group header at the head position, and CGMSA settings are made in the video recorder based on digital copy control. Moreover, if a digital output (IEEE1394, Internet, or the like) is available, 0: scramble ON or output inhibition or 1: direct output is set in the output IC based on the EPN value. If ICT=0, the image resolution is constrained, i.e., HD is converted into SD; if ICT=1, "direct output" is set in the output IC. At this time, if the playback start frame is not I-picture data, decoding starts from the preceding I-picture, and display starts when the target frame is decoded, thus starting normal playback.

6) A process upon playback start is executed.

7) Respective decoders are set.

8) A cell playback process is executed, and it is then checked if playback is to end. If playback is to end, an error check process is executed. If any error is found, a message that advises accordingly is displayed; otherwise, a playback end process is executed, thus ending this operation.

9) The next cell is determined based on PGCI, and it is checked if the settings of the decoder have been changed. If the settings of the decoder have been changed, changed attributes are set in the decoder so as to change decoder settings in response to the next sequence end code.

10) It is checked if playback is complete. If playback is not complete yet, the control returns to 6).

The decoder setting process is executed, for example, as follows.

1) A group to be played back is determined, and ESs to be played back are determined in accordance with GPI.

2) Attribute information (STI, ESI) is loaded.

3) It is checked if a format is supported by the recorder. If the format is supported, corresponding settings are made; otherwise, mute is set.

4) It is checked if video data to be played back can be played back. If video data can be played back, playback preparation is made; otherwise, mute is set. In this case, the PID can be used intact if the 13-bit PID is set. However, the PID is determined with reference to PMT data if it is set based on the order in the PMT data.

5) It is checked if audio data to be played back can be played back. If the audio data can be played back, playback preparation is made; otherwise, mute is set. In this case, the PID can be used intact if the 13-bit PID is set. However, the PID is determined with reference to PMT data if it is set based on the order in the PMT data.

6) A copy control process is executed based on CCI information.

The cell playback process is executed, for example, as follows.

1) Cell start FP (LBN) and end FP are determined on the basis of the contents of TMAPI. Furthermore, start ESOBU_ENTRY and end ESOBU_ENTRY are determined based on the start and end times in CELLI, and the data lengths of entries until target ESOBU_ENTRY are accumulated in ADR_OFS, thus calculating a start address (LB=FP) and end address. The remaining CELL length is calculated by subtracting the start address from the end address, and the playback start time is set in the STC. The PID to be played back is determined and is set in the decoder (STB, digital tuner). In this case, the PID can be used intact if the 13-bit PID is set. However, the PID is determined with reference to PMT data if it is set based on the order in the PMT data.

2) A read process during playback is executed to determine the read address and read size based on the start file pointer.

3) The read unit size to be read out is compared with the remaining cell length. If the remaining cell length is larger than the read unit size, a value obtained by subtracting the read unit size to be read out from the remaining cell length is set as the remaining cell length. If the remaining cell length is smaller than the read unit size, the read unit size is set to be the remaining cell length, and the remaining cell length is set to be zero.

4) The read length is set to be a read unit length, and the read address, read length, and read command are set in the disc drive unit.

5) The control waits until data for one ESOBU are stored. If data for one ESOBU are stored, a buffer decoder transfer process is executed, and the control advances to the next process.

6) It is checked if transfer is complete. If transfer is complete, the control advances to the next process.

7) It is checked if an angle key or the like has been pressed. If the angle key has been pressed, it is checked if GPI is available. If GPI is available, a GP switching process is executed; otherwise, the control advances to the next process without any process.

8) It is checked if a Skip SW has been pressed. If the Skip SW has been pressed, a SKIP process is executed.

9) It is checked if a STOP SW has been pressed. If the STOP SW has been pressed, resume information (RSM_IFO) is saved in PG_RSM_IFO in case of title playback or in PL_RSM_IFO in case of playlist playback, and an end process is executed.

10) The remaining cell length is checked. If the remaining cell length is not "00", the control returns to 2); if it is "00", this process ends.

The buffer data decoder transfer process is executed, for example, as follows.

1) The number of packet groups in the buffer RAM is checked. If no packet group is found, the control skips the process. If one or more packet groups are stored in the buffer RAM, a setting is made to process the first packet group.

2) A target packet group is read out from the buffer RAM. The head of the packet group is detected based on the packet group length and Sync_Pattern.

3) The STUF bit of the packet group header is checked. If "1" is set, valid packets are extracted in accordance with the value of VALID_PKT_Ns. If "1" is not set, it is determined that 170 packets are valid ones.

4) The PATS accuracy is detected based on PATS_SS, and a transfer time of each TS packet is calculated from the PATS data (4 bytes), FIRST_PATS_EXT, and PATS_WRAPI on the basis of that accuracy information, and each TS packet is sent to decoder unit 59 (STB unit) at that time.

In case of 6-byte accuracy: A calculation is made using FIRST_PATS_EXT as the upper 2 bytes of PATS data of the first packet of the packet group, and the lower 4 bytes of the preceding PATS data from there.

In case of 4-byte accuracy: PATS data is calculated from the preceding PATS data and PATS_WRAPI in consideration of carry.

In case of no accuracy: After packet data is extracted, a TS packet is output as soon as a request is received.

5) It is checked if MNF is available. If MNF is available, it is checked if its ID matches that of the manufacturer of the apparatus of interest. If the two IDs match, that data is loaded to execute a predetermined process (process unique to each company).

6) A CCI process is executed.

7) A discontinue process is executed.

8) The control waits for completion of transfer, and it is checked if packet groups still remain in the buffer RAM. If no packet group remains in the buffer RAM, this process ends.

9) A setting is made to process the next packet group, and the control returns to 2).

The GP switching process is executed, for example, as follows.

1) The type of selector SW is checked.

2) The GPI of the GP whose playback is currently in progress is loaded.

3) It is checked if the GPI is stored. If no GPI is stored, this process ends.

4) The GPI information is loaded to switch another GP, and a decoder setting process is executed.

The discontinue process is executed, for example, as follows.

1) DCNI is checked. If a CNT_SEG gap is found at the playback position, the playback mode of the decoder is shifted to an internal clock mode (an operation mode that ignores the PTS value, makes playback using internal clock values, and enables PTS data upon reception of PCR data: external sync mode), thus ending this process.

2) If no CNT_SEG gap is found, this process ends without any process.

The SKIP process can be executed, for example, as follows.

1) An EPIT is loaded.

2) The SKIP direction (determined by the type of SKIP key) is checked. If the SKIP direction is the forward direction, an EP which is located ahead of the current playback position and has the same PID as the current playback PID is searched for, and its information is loaded. On the other hand, if the SKIP direction is the backward direction, an EP which is located before the current playback position and has the same PID as the current playback PID is searched for, and its information is loaded.

3) An ESOBU_ENT to be played back is determined based on the detected EPI.

4) ESOBU_ENT information is loaded to determine the playback start time (STC).

5) It is checked if the target ESOBU_ENT includes I-PIC (1ST_Ref_SZ=0). If the target ESOBU_ENT includes no I-PIC, the preceding ESOBU_ENT information of the identical or similar group is loaded to repeat 5).

6) It is checked if a sequence header exists before I-PIC in the ESOBU_ENT (ESOBU_SH_I_EXIST_Flag). If the sequence header exists, the control advances to 8). (If only ESOBU_SH_EXIST_Flag is found, this process is also done based on ESOBU_SH_EXIST_Flag.)

7) The preceding ESOBU_ENT information of the identical or similar group is loaded, and it is checked if a sequence header exists in the ESOBU_ENT (ESOBU_SH_EXIST_Flag). If no sequence header exists, the control repeats 7).

8) The SH is loaded and is set in the decoder. Then, the I-PIC found previously is read out, and the decoder is set to start decoding from that position, and to start display from the playback time designated by the EP, thus shifting to a normal playback process.

Definition of ESOBU of Type A

The ESOBU of type A can be defined, for example, as follows.

1) An ESOBU is defined as a short sequence stream which starts from a sequence header followed by I-PIC, and has a playback time from 0.4 s to 1 s.

2) If the next sequence header followed by I-PIC cannot be found within a playback time of 1 s, this ESOBU ends within 1 s, and 0 is set in 1st_Ref_SZ.

3) Even "in case of 2)", it is recommended to end the ESOBU before a reference picture (i.e., I-PIC or P-PIC) wherever possible.

4) If a reference picture cannot be found for a long period of time, and if no point that meets the above conditions "1) to 3)" is found, the ESOBU can end before the non-reference picture (B-PIC).

In this case, picture (P50) obtained by decoding the last reference picture of this ESOBU is not included in a count of ESOBU_PB_TM, but is included in that of ESOBU_SZ.

5) The ESOBU playback time (ESOBU_PB_TM) is measured in the playback order (order upon displaying respective pictures), and the ESOBU size (ESOBU_SZ) is measured in the recording order (order upon recording on a disc).

6) In most cases, the ESOBU boundary lines align at picture boundaries (before the sequence header or picture header).

7) An ESOBU except for the following case has a playback time from 0.4 s to 1 s. The last ESOBU of an ESOB can have a playback time shorter than 0.4 s. In case of an ESOBU which does not start from a sequence header followed by I-PIC, a playback time shorter than approximately 0.4 s can be set.

Definition of ESOBU of Type B

Note that an ESOBU of type B can be defined as follows.

An ESOBU is defined as a set of packets which have arrived within a predetermined time period as arrival times (PATS).

A description will be continued about principal part of the system that executes digital broadcast recording using the configuration shown in FIGS. 1 to 19. In the above description, "E" is attached like an ESOB (Extended Stream object) or ESOBU (Extended Stream object unit), but the following description will be given by omitting "E". An SOB or SOBU without "E" represents a more generic concept that encompasses the meanings of ESOB and ESOBU that have been explained using the configuration of FIGS. 1 to 19. For example, both an ESOB and SOB normally correspond to an MPEG2-TS data stream, but an SOB in the following description also includes a digital stream signal of MPEG4-AVC or other formats (having contents corresponding to MPEG2-TS) (however, an ESOB is not limited to only MPEG2-TS related contents).

FIG. 20 is a block diagram showing digital broadcast recorder 201 as the revision of principal part of the digital recorder/player shown in FIG. 16. Digital broadcast recorder 201 receives a signal from antenna 202 by digital tuner 2011, and extracts data of a Partial Transport Stream (to be abbreviated as TS hereinafter as needed) that includes the tuned broadcast. This TS data is converted by Packet Group processor 2012 into data of a Packet Group format assigned a Packet Group Header for approximately every 32 kB, and the converted data is recorded in HDD (and/or optical disc) 2014 or the like via Stream Buffer 2013.

On the other hand, MPEG Stream parser 2015, which parses the data of the Packet Group format generated by Packet Group processor 2012, parses an MPEG Stream to detect a GOP start position (start position of 1st Reference Picture) in the data, the contents of Section information such as PAT/PMT data, and the like, and records information in HDD (and/or optical disc) 2014 as management information (information of .IFO files in FIG. 2). Upon playing back recorded data based on this management information, the recorded data is transmitted to MPEG2-TS Decoder 2016 via Stream Buffer 2013 to decode MPEG data, and the decoded data is output to Digital TV 203 via the HDMI terminal, D3 to D5 terminals, IEEE1394, and the like.

Note that the processing functions of Packet Group processor 2012 and MPEG Stream parser 2015 in FIG. 20 can be implemented as firmware of MPU unit 80 in FIG. 16.

Figure 21:
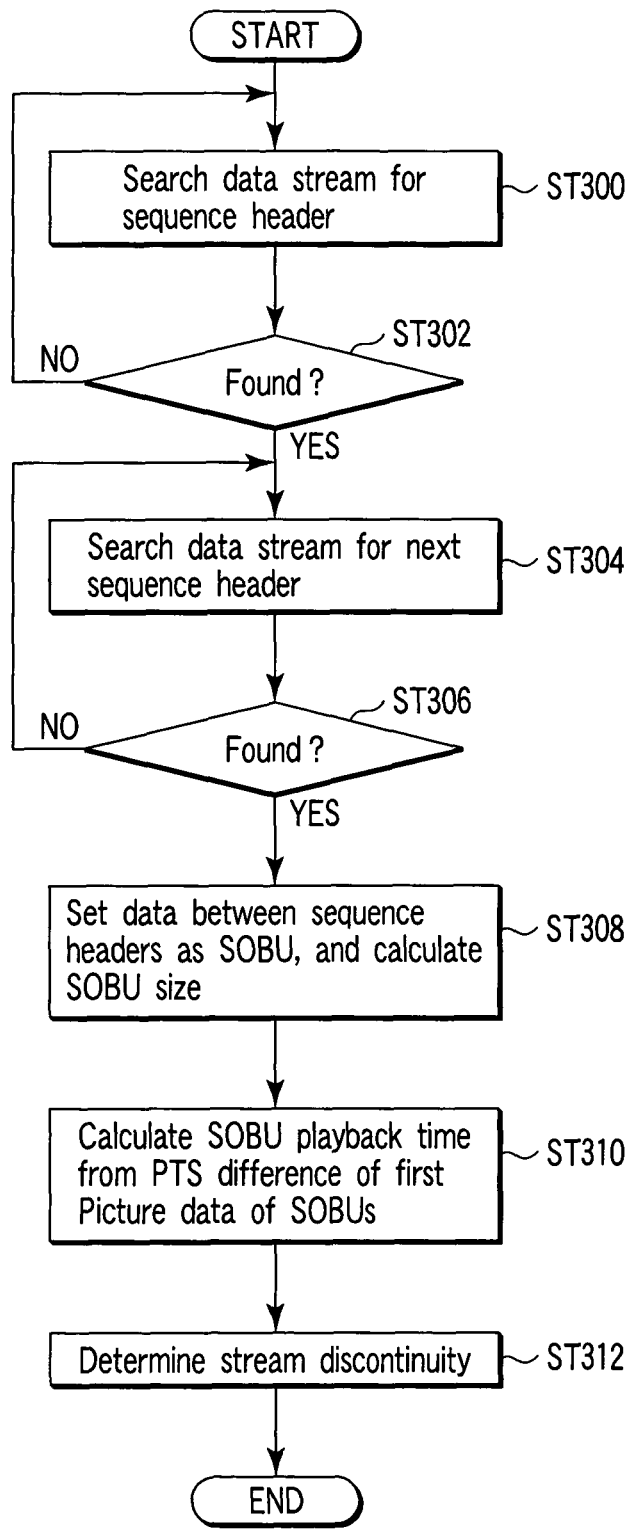
FIG. 21 is a flowchart for explaining an example of the processing contents of an MPEG Stream parser upon digital broadcast recording.

FIG. 21 shows an example of the processing contents of MPEG Stream parser 2015 upon digital broadcast recording. When recording starts, MPEG Stream parser 2015 parses a data stream to search for a Sequence Header (SH) (step ST300). If the first Sequence Header is found (YES in step ST302), parser 2015 searches for the next Sequence Header (step ST304). In case of digital broadcast (ARIB in Japan), since a Sequence Header is inserted at the GOP start position, a GOP can be detected if the Sequence Header is searched for.

In an embodiment of the invention, one GOP is managed as a stream object unit (SOBU or ESOBU). The SOBU stores an SOBU size and SOBU playback time, and the number of packet groups between neighboring Sequence Headers (SH) is stored as the SOBU size (step ST308). On the other hand, as for the SOBU playback time, PTS (Presentation Time Stamp) data of the first Picture of respective SOBUs are obtained from the data stream, and each SOBU playback time is calculated based on their difference (step ST310).

Discontinuity determination of the data stream to be recorded (step ST312) is executed on the basis of the calculated SOBU size and playback time as needed during the recording process.

The embodiment disclosed in FIGS. 1 to 19 exemplifies that a data stream complying with an MPEG-TS having identical or similar attributes is handled as a stream object (SOB or ESOB). Therefore, in order to realize a recorder/player that complies with this format, a difference in attributes in the MPEG-TS is checked, and if such inconsistency is detected, the subsequent object is managed as another stream object. In order to detect such attribute inconsistency, section information such as PAT, PMT, or the like is monitored, and when different attributes are found, the subsequent data stream is managed as a new stream object.

Figure 22:
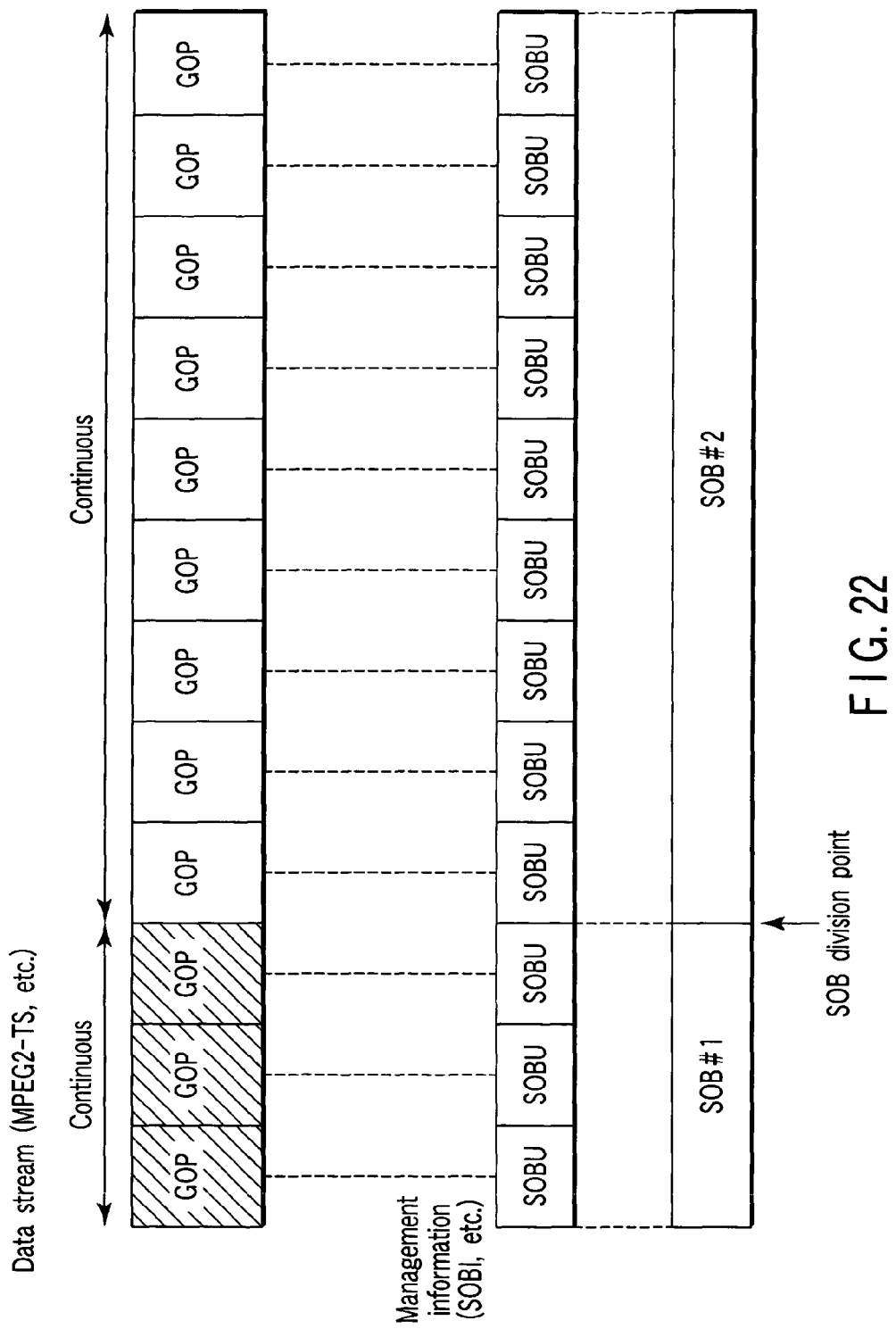
FIG. 22 is a view for explaining a state wherein stream objects are formed for continuous GOP groups in a data stream (MPEG-TS), and the stream objects are divided at a GOP discontinuous point.

FIG. 22 shows an example of the relationship between SOBUs and SOBs, which is stored in management information (ESOBI, TMAPI, and the like in FIGS. 4 to 13). FIG. 22 exemplifies a state wherein stream objects are formed for respective continuous GOP groups in a data stream (MPEG-TS), and are divided at a GOP discontinuous point.

Note that the continuity/discontinuity of a data stream is checked, and if discontinuity is detected (step ST312 in FIG. 21), the subsequent object is managed as another stream object. This is because since MPEG performs encoding/decoding by exploiting reference clocks called SCR, any discontinuity of a data stream means that of this SCR counter, and playback cannot be normally done at the discontinuous point.

Figure 23A:
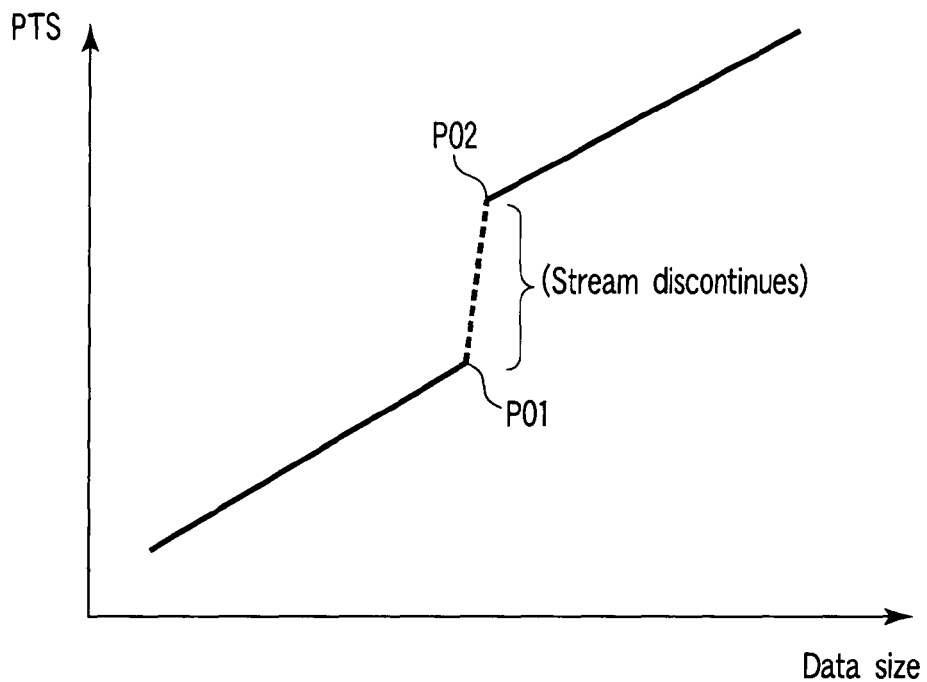
FIGS. 23A and 23B are views each for explaining an example of the relationship between an increase in time stamp (PTS) and an increase in corresponding data size upon recording a data stream (MPEG-TS)

For example, the factor of the discontinuous data stream occurs when an edit process is done using a digital video cassette (DVHS: registered trademark). When an edit process is made using a tape medium such as DVHS or the like, an unnecessary section can be skipped by a recording pause or the like. Since the DVHS records a TS intact, the recording-paused section of that TS drops out directly. When such TS is recorded, PTS values largely jump at the edit point (P01→P02), as shown in FIG. 23A.

Figure 23B:
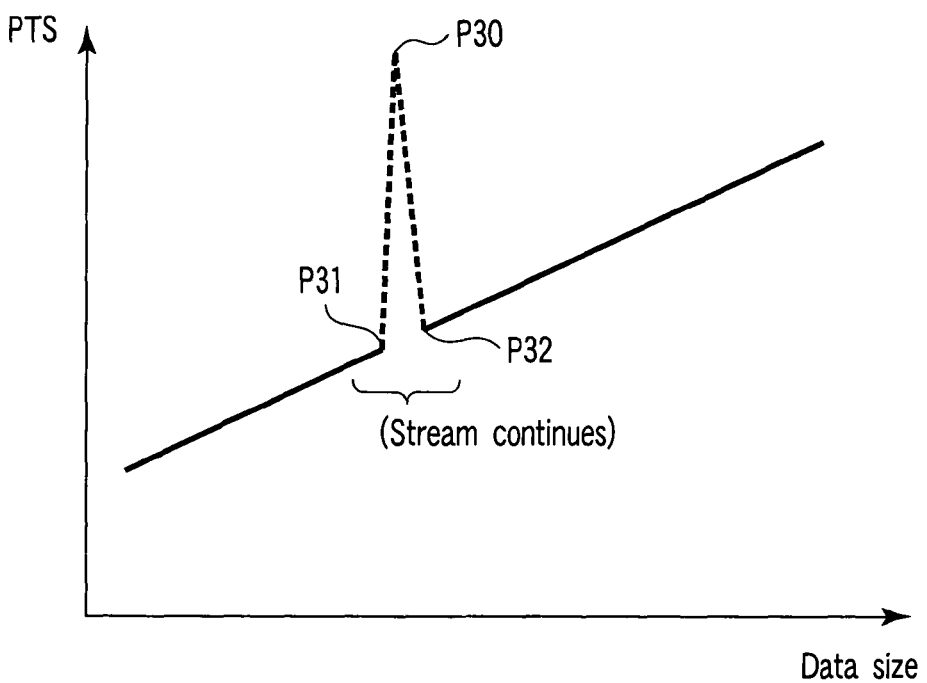

Alternatively, even when the stream itself is continuous, an error can occur in part of data on a transmission path, and the error of the PTS value can be found in a small section. In this case, as shown in FIG. 23B, the PTS is partially discontinued (P31→P30), and then returns to be continuous data (P30→P32). In this case, when the PTS is recorded as the continuous data, the number of stream objects can be saved (as a result, the SOB management information size is also saved).

Hence, in an embodiment of the invention, these two events are discriminated by the difference between a PTS gap and an internal counter (PATS internal counter 90*a* in FIG. 16) value obtained when receiving the PTS. This process will be described in detail with reference to FIG. 24.

FIG. 24 is a graph for recording a Stream which is discontinued midway such as the Stream in an edit process using the DVHS (registered trademark). While the internal counter (PATS counter) value on the abscissa monotonically increases (constant gradient), the PTS value on the ordinate abruptly changes from the preceding value in a discontinuous portion (an abrupt change in a gradient P01→P02). With respect to this Stream, GOP group 701 can be detected by MPEG Stream parser 2015. Reference numeral 702 denotes the internal counter (PATS) value obtained when receiving the first picture of GOP#1 upon detection of GOP#1, and reference numeral 703 denotes the internal counter (PATS) value obtained when receiving the first picture of GOP#2 upon detection of GOP#2. Also, reference numeral 704 denotes the PTS value of the first Picture of GOP#1, and reference numeral 705 denotes the PTS value of the first Picture of GOP#2.

If a normal Stream is recorded, the ratio (gradient) of a PATS difference between values 702 and 703 to a PTS difference between values 704 and 705 is to be constant. This is because the SCR counter serving as a base to generate the PTS is in synchronism with the internal counter. As in portion 707 (an abrupt change in a gradient P01→P02), when the ratio is different from the preceding ratio, it is determined that the Stream is discontinuous in this portion. In this case, the stream object is divided and recorded in this portion (an abrupt change in a gradient P01→P02) (e.g., step ST530 shown in FIG. 25).

Figure 25:
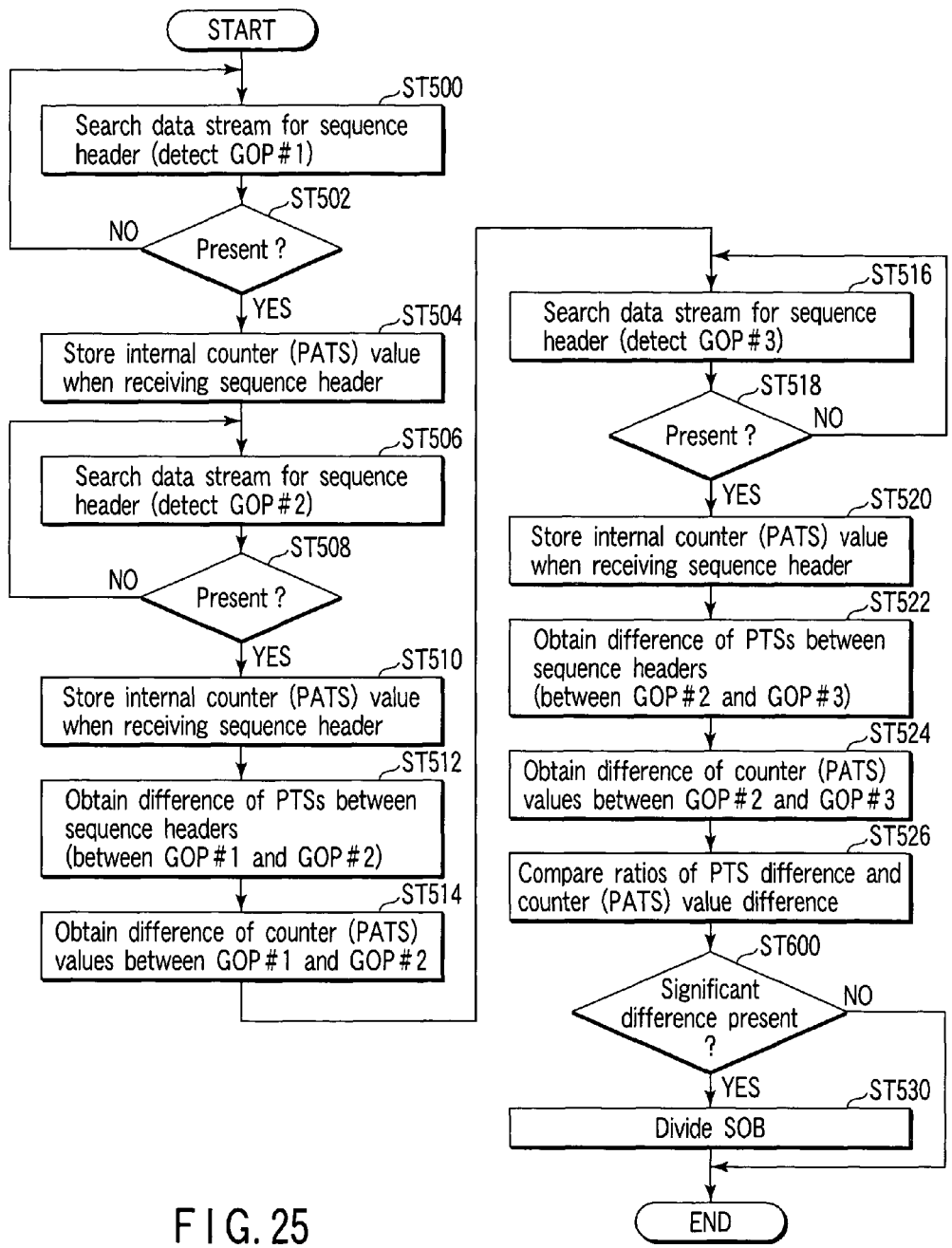
FIG. 25 is a flowchart for explaining an example of the operation of the MPEG Stream parser.

FIG. 25 is a flowchart showing the operation of MPEG Stream parser 2015. As shown in FIG. 21, first, the MPEG Stream is parsed to detect a GOP boundary (step ST500). Whenever the GOP is detected (YES in step ST502), the internal counter (PATS counter 90*a*) value added to the first TS packet of the GOP is stored (step ST504), and then the next GOP is detected (step ST506).

When the second GOP boundary is found (YES in step ST508), the internal counter (PATS) value is also stored (step ST510), and the PTS difference between two GOP boundaries is obtained (step ST512). Similarly, upon detection of the third GOP boundary, the internal counter (PATS) value and the PTS difference between the GOP boundaries are obtained (step ST514). Hence, value (703 to 702) shown in FIG. 24 and value (705 to 704) are obtained to calculate the ratio (the gradient of the straight line shown in FIG. 24). The same process is performed in the next GOP, and the ratio (gradient) is compared with the preceding ratio. Hence, the discontinuous point of the PTS such as portion 707 (an abrupt change in a gradient P01→P02) can be found (the processes after step ST516 will be described later).

Figure 26:
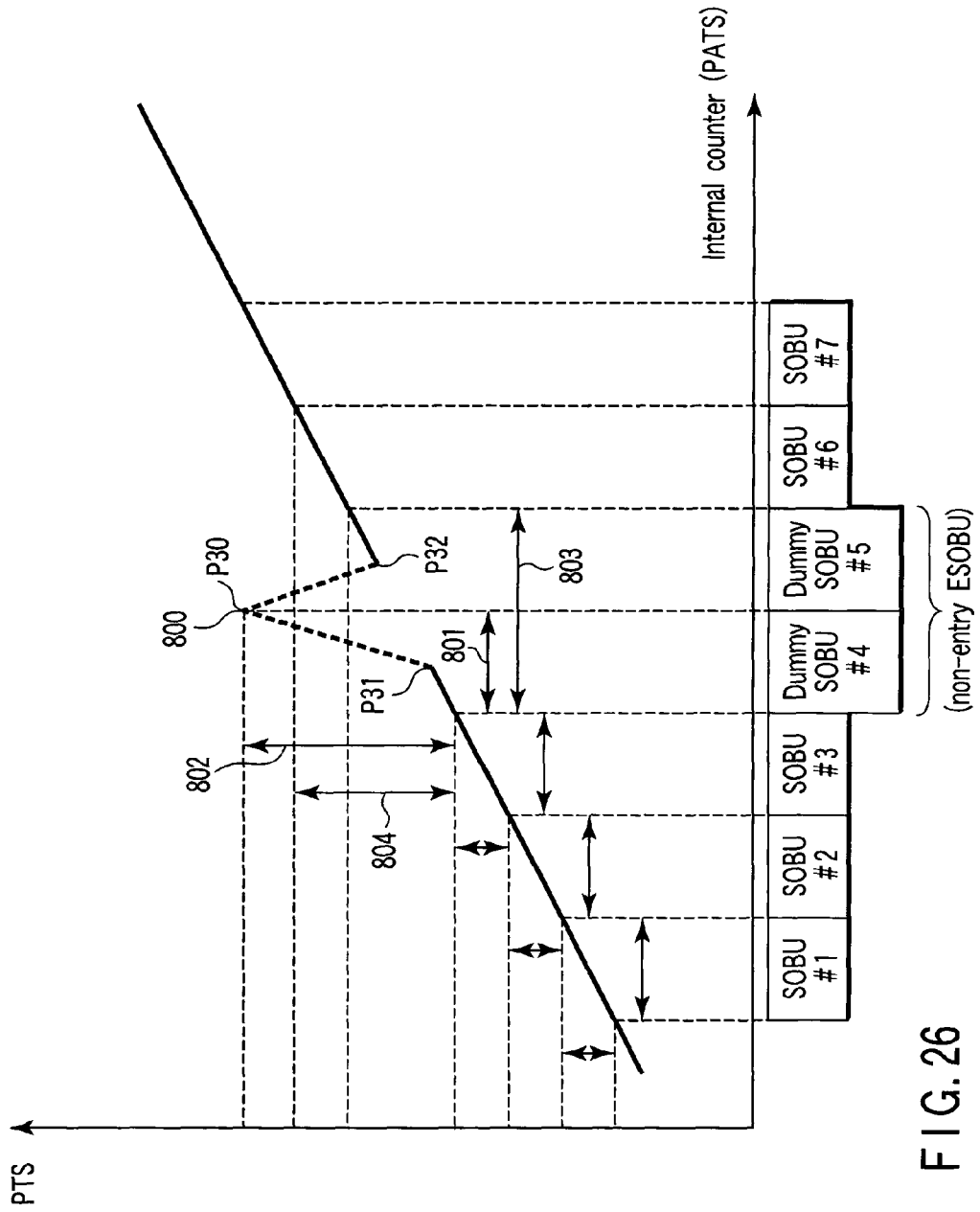

FIG. 26 is a graph for recording the Stream in which the PTS value is partially destroyed by noise on the transmission path or the like. As shown in FIG. 24, assume that GOP 800 (P30 shown in FIG. 26) with an abnormal PTS is detected during recording (steps ST516 to S518). Reference numeral 801 denotes the difference between the internal counter (PATS counter 90a) values (step ST520), and reference numeral 802 denotes the difference between the PTS values (step ST522). It is determined that the significant difference is exhibited in the ratio (steps ST524 to ST526) (YES in step ST600), and the SOB is divided (step ST530).

In FIG. 26, a fourth GOP is also detected (steps ST516 to ST518). Then, values 803 and 804 of the portion in which the error is found are obtained before the fifth GOP is detected, and the ratio between these values is compared with the preceding ratio (steps ST520 to ST526 shown in FIG. 25; or steps ST604 to ST606 shown in FIG. 27). In FIG. 26, one abnormal GOP is detected, and the ratio between values 804 and 803 is the same as the normal one (NO in step ST600). Hence, it can be determined that a recording process can be continued without dividing the SOB. In this case, since the pieces of information of the neighboring GOPs of the point at which the PTS error is detected are not reliable, the SOBU information is generated using the internal counter (PATS counter 90a) value. Since this SOBU information is not actually read out from the Stream, it is called dummy SOBU information in FIG. 26.

Figure 27:
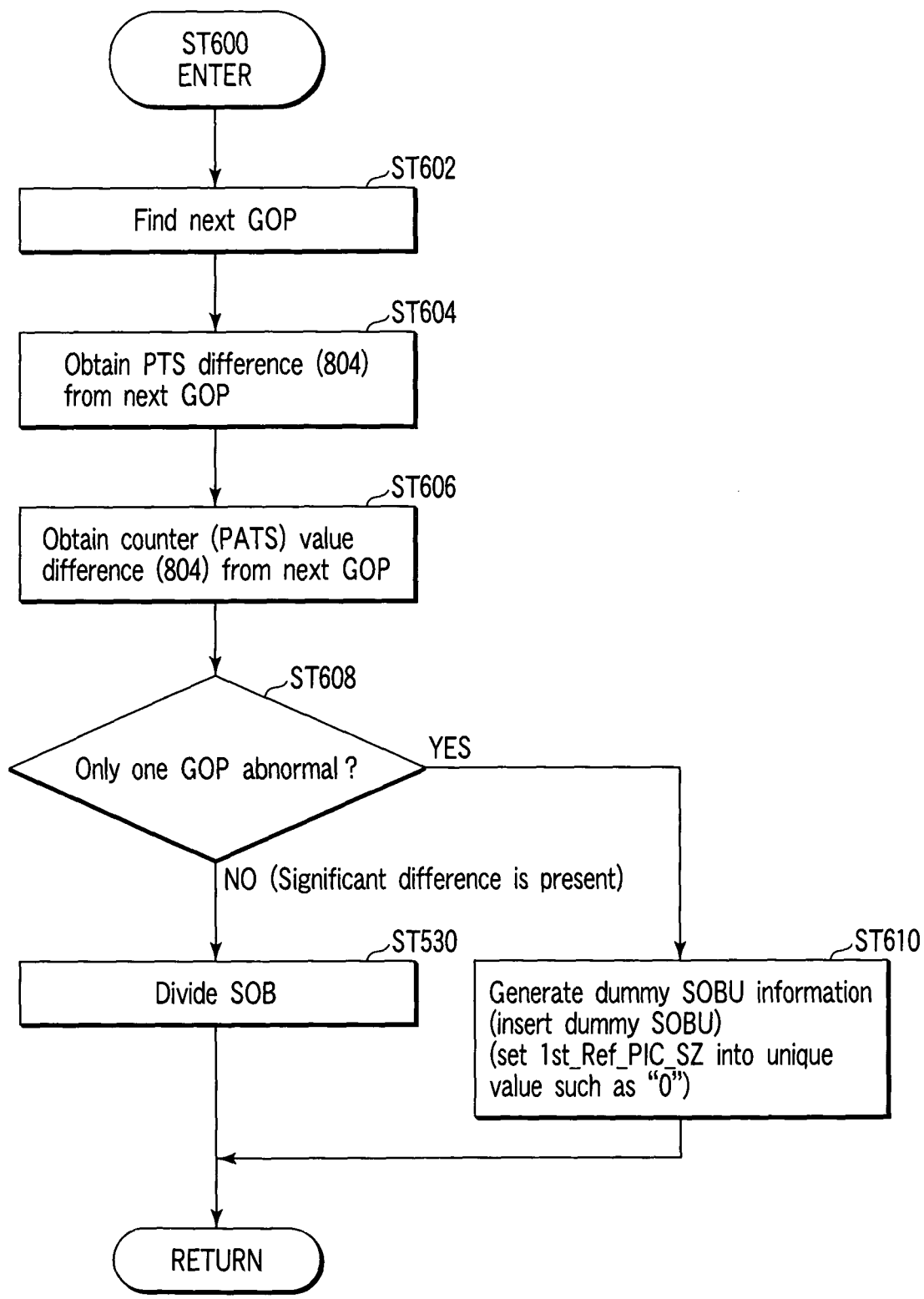
FIG. 27 is a flowchart for explaining a detailed example of a process in a case wherein a significant difference is exhibited (YES in ST600→divide SOB) or not exhibited (NO in ST600→insert dummy SOBU) when determining the significant difference between a PTS difference and a PATS difference in step ST600 shown in FIG. 25.

FIG. 27 shows an example of the processing up to determination of whether the SOB is divided or the dummy SOBU is inserted in accordance with whether the number of the abnormal GOP is one. FIG. 27 shows the process after step ST600 shown in FIG. 25. When the significant difference is exhibited in the ratio between the PTS value and the counter value (YES in step ST600), and the discontinuous Stream is detected, the above-described fourth GOP is detected (step ST602) to calculate the ratio (steps ST604 to ST606). Therefore, it is determined whether the one GOP is abnormal, or there is an actual discontinuous point at the point. When only one GOP is abnormal (YES in step ST608), the SOB is not divided. The dummy SOBU information for compensating for the error GOP is generated using the internal counter (PATS counter 90a) value (step ST610) without dividing the SOBU. As a result, the number of SOBs can be saved.

Note that when the dummy SOBU is generated, in order to discriminate the dummy SOBU (without broadcast contents) from the normal SOBU (with broadcast contents), information (e.g., 1st_Ref_PIC_SZ in which "0" is written) indicating that the SOBU is the dummy SOBU (or non-entry ESOBU) is written into the dummy SOBU management information (e.g., ESOBU_ENT shown in FIG. 13) (step ST610).

By adopting the process in FIG. 27, stream object division (step ST530) is not always done at the abnormal point of stream data, but a case that does not make stream object division (step ST610) by, e.g., dummy SOBU insertion or the like is allowed. Hence, the stream object management information size can be prevented from unnecessarily increasing due to occurrence of the abnormal stream data (e.g., occurrence of the error in the time stamp information).

Note that the present invention is not limited to the aforementioned embodiments, and various modifications may be made on the basis of techniques available at that time without departing from the scope of the invention when it is practiced at present or in the future. The respective embodiments may be combined as needed to any extent, and combined effects can be obtained in such case. Furthermore, the embodiments include inventions of various stages, and various inventions can be extracted by appropriately combining a plurality of required constituent elements disclosed in this application. For example, even when some required constituent elements are omitted from all the required constituent elements disclosed in the embodiments, an arrangement from which those required constituent elements are omitted can be extracted as an invention.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The invention claimed is:

1. A non-transitory computer-readable information storage medium or a non-transitory computer-associated-machine-readable information storage medium configured to have data recorded thereon by a computer-associated recording apparatus and/or data reproduced therefrom by a computer-associated reproducing apparatus, the data including management information and digital stream information comprising a digital stream signal, wherein the digital stream signal is a digital stream signal of an MPEG2 transport stream or having contents corresponding to the MPEG2 transport stream, and the digital stream signal comprises one or more GOPs, the information storage medium comprising:
   a data area configured to record data of the digital stream signal as not less than one object, the object being recorded with one or more data units; and
   a management area configured to record management information for a stream of the object;
   wherein the management area is configured to record particular information indicating that a particular data is recorded at a particular place, the particular data corresponding to an unread-stream or an unrepaired stream,
   wherein the particular information is configured to be recorded in the management area when a discontinuous time flow exists in the digital stream signal,
   wherein the particular information is not recorded as the data of the digital stream signal to be recorded in the data area, and
   wherein, except for a case in which only one GOP is abnormal, the object divided where the stream is discontinuous is configured to be recorded on the data area.

2. The medium of claim 1 wherein the digital stream signal is a digital stream signal of an MPEG2 transport stream or having contents corresponding to the MPEG2 transport stream, and
   when the particular place exists for a place including one abnormal GOP, a predetermined value is recorded as the particular information.

3. The medium of claim 1 further comprising a pair of a value of time stamp information of a previously detected picture and a value of a counter.

4. The medium of claim 1 further comprising a time stamp of a first picture of a GOP.

5. A method of recording the digital stream signal on the data area and the management information on the management area of the information storage medium as defined in claim 1.

6. A method of reproducing the management information from the management area and the digital stream signal from the data area of the information storage medium as defined in claim 1.

7. A recording apparatus for recording a digital stream signal on an information storage medium, wherein the information storage medium comprises a data area configured to record data of the digital stream signal as not less than one object, the object being recorded with one or more data units, and a management area configured to record management information for a stream of the object, wherein the digital stream signal is a digital stream signal of an MPEG2 transport stream or having contents corresponding to the MPEG2 transport stream, and the digital stream signal comprises one or more GOPs, the recording apparatus comprising:
- a counter which is synchronized with a clock reference on the digital stream signal;
- a processor configured to store a value of time stamp information of a previously detected picture and a value of the counter when the digital stream signal is recorded;
- wherein the processor is further configured to compare an increase in the time stamp information with an increase in the counter upon detection of next time stamp information;
- wherein the processor is further configured to determine an occurrence of an error in the value of the time stamp information when a difference is detected between the increase in the time stamp information and the increase in the counter;
- wherein the processor is further configured to record particular information indicating that a particular data is recorded at a particular place, the particular data corresponding to an unread-stream or an unrepaired stream;
- wherein the particular information is configured to be recorded in the management area if the error occurs;
- wherein the particular information is not recorded as the data of the digital stream signal to be recorded in the data area, and
- wherein, except for a case in which only one GOP is abnormal, the object divided where the stream is discontinuous is configured to be recorded on the data area.

8. The recording apparatus of claim 7 wherein the processor is further configured to detect a GOP in the digital stream signal to be recorded;
- wherein the processor is further configured to store a time stamp of a first picture of the GOP;
- wherein the processor is further configured to form a pair of a value of the counter and a value of the time stamp of the picture of the GOP upon detection of the GOP; and
- wherein the processor is further configured to compare a difference between the values of the time stamps of the GOPs and a difference between the values of the counters upon detection of a next GOP.

9. The recording apparatus of claim 7 wherein the processor is further configured to form a pair of the value of the counter and the value of the time stamp of the picture of a GOP upon detection of the GOP;
- wherein the processor is further configured to calculate a ratio between the difference between the values of the counters and the difference between the values of the time stamps of the GOPs; and
- wherein the processor is further configured to determine an occurrence of the error in the value of the time stamp when the difference is detected in the calculated ratio.

10. The recording apparatus of claim 7 wherein the processor is further configured to form a pair of the value of the counter and the value of the time stamp of the picture of a GOP upon detection of the GOP;
- wherein the processor is further configured to calculate a ratio between the difference between the values of the counters and the difference between the values of the time stamps of the GOPs, and a ratio between the difference between the values of the counters and the difference between the values of the time stamps of the GOPs upon detection of an immediately preceding GOP; and
- wherein the processor is further configured to determine an occurrence of an error in a time stamp of the immediately preceding GOP if the difference is not detected in the ratio between the GOP and a second preceding GOP even when the difference is detected in the ratio between the GOP and the immediately preceding GOP.

11. The recording apparatus of claim 7 wherein the processor is further configured to form a pair of the value of the counter and the value of the time stamp of the picture of a GOP upon detection of the GOP;
- wherein the processor is further configured to calculate a ratio between a difference between the values of the counters and the difference between the values of the time stamps of the GOPs, and a ratio between the difference between the values of the counters and the difference between the values of the time stamps of the GOPs upon detection of an immediately preceding GOP; and
- wherein the processor is further configured to determine a discontinuous point of a stream at the position when the difference is detected in the ratio between the GOP and the immediately preceding GOP, and the difference is also detected in the ratio between the GOP and a second preceding GOP.

12. The recording apparatus of claim 7 wherein the recording is performed by:
- using a counter which is synchronized with a system clock reference on the digital stream signal;
- storing, when the digital stream signal is recorded, a value of time stamp information of a previously detected picture and a value of the counter;
- comparing an increase in the time stamp information with an increase in the counter upon detection of next time stamp information;
- determining occurrence of an error in the value of the time stamp information when a difference is detected; and
- performing a recording process.

13. The recording apparatus of claim 7 wherein the recording is performed by:
- using a counter which is synchronized with a system clock reference on the digital stream signal;
- detecting a GOP in the digital stream signal to be recorded;
- storing a time stamp of a first picture of the GOP;
- forming a pair of a value of the counter and a value of the time stamp of the picture of the GOP upon detection of the GOP;
- comparing a difference between the values of the time stamps of the GOPs and a difference between the values of the counters upon detection of a next GOP;
- determining occurrence of an error in the value of the time stamp when a difference is detected; and
- performing a recording process.

14. The recording apparatus of claim 13 wherein the recording is further performed by:
  calculating a ratio between the difference between the values of the counters and the difference between the values of the time stamps of the GOPs;
  determining the occurrence of the error in the value of the time stamp when the difference is detected in the calculated ratio; and
  performing the recording process.

15. The recording apparatus of claim 13 wherein the recording is further performed by:
  calculating a ratio between the difference between the values of the counters and the difference between the values of the time stamps of the GOPs, and a ratio between the difference between the values of the counters and the difference between the values of the time stamps of the GOPs upon detection of an immediately preceding GOP;
  even when the difference is detected in the ratio between the GOP and the immediately preceding GOP, if the difference is not detected in the ratio between the GOP and a second preceding GOP, determining occurrence of an error only in a time stamp of the immediately preceding GOP; and
  performing the recording process.

16. The recording apparatus of claim 13 wherein the recording is further performed
  calculating a ratio between the difference between the values of the counters and the difference between the values of the time stamps of the GOPs, and a ratio between the difference between the values of the counters and the difference between the values of the time stamps of the GOPs upon detection of an immediately preceding GOP;
  when the difference is detected in the ratio between the GOP and the immediately preceding GOP, and the difference is also detected in the ratio between the GOP and a second preceding GOP, determining a discontinuous point of a stream at the position; and
  performing the recording process.

17. A playback apparatus for playing back a digital stream signal stored on an information storage medium, wherein the information storage medium comprises a data area configured to record data of the digital stream signal as not less than one object, the object being recorded with one or more data units, and a management area configured to record management information for a stream of the object, wherein the digital stream signal is a digital stream signal of an MPEG2 transport stream or having contents corresponding to the MPEG2 transport stream, and the digital stream signal comprises one or more GOPs, the playback apparatus comprising:
  a management information processor configured to reproduce information from the management area; and
  a stream signal processor configured to play back information of the digital stream signal from the data area,
  wherein the management area records particular information indicating that particular data is recorded at a particular place, the particular data corresponding to an unread-stream or an unrepaired stream,
  wherein the particular information is configured to be recorded in the management area if a discontinuous time flow exists in the digital stream signal,
  wherein the particular information is not recorded as the data of the digital stream signal to be recorded in the data area, and
  wherein, except for a case in which only one GOP is abnormal, the object divided where the stream is discontinuous is configured to be recorded on the data area.

18. The playback apparatus of claim 17 wherein the digital stream signal is the digital stream signal of an MPEG2 transport stream or having contents corresponding to the MPEG2 transport stream.

19. The playback apparatus of claim 17 wherein when one abnormal GOP is found in the digital stream signal, a dummy data unit is configured to be adopted as the particular data.

* * * * *